(12) United States Patent
Irisawa et al.

(10) Patent No.: US 8,179,447 B2
(45) Date of Patent: May 15, 2012

(54) IMAGING APPARATUS HAVING BLUR CORRECTION MECHANISM

(75) Inventors: Shigeru Irisawa, Chigasaki (JP); Yohsuke Suzuki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 334 days.

(21) Appl. No.: 12/529,220

(22) PCT Filed: Mar. 13, 2008

(86) PCT No.: PCT/JP2008/055162
§ 371 (c)(1),
(2), (4) Date: Aug. 31, 2009

(87) PCT Pub. No.: WO2008/114841
PCT Pub. Date: Sep. 25, 2008

(65) Prior Publication Data
US 2010/0091122 A1    Apr. 15, 2010

(30) Foreign Application Priority Data

Mar. 16, 2007 (JP) .................................. 2007-068230
May 22, 2007 (JP) .................................. 2007-135116
Oct. 10, 2007 (JP) .................................. 2007-263958

(51) Int. Cl.
*H04N 5/228* (2006.01)
*H04N 5/225* (2006.01)

(52) U.S. Cl. ...................... 348/208.7; 348/374; 348/376

(58) Field of Classification Search ... 348/208.7–208.11
See application file for complete search history.

(56) References Cited

U.S. PATENT DOCUMENTS

| | | | |
|---|---|---|---|
| 7,133,224 B2 | 11/2006 | Irisawa | |
| 7,286,164 B2 | 10/2007 | Shinohara et al. | |
| 7,327,952 B2 | 2/2008 | Enomoto | |
| 7,433,137 B2 * | 10/2008 | Irisawa | 359/819 |
| 7,643,750 B2 * | 1/2010 | Irisawa et al. | 396/542 |
| 7,697,033 B2 * | 4/2010 | Serikawa et al. | 348/208.3 |
| 2002/0154223 A1 | 10/2002 | Moriya | |
| 2005/0232617 A1 | 10/2005 | Uenaka et al. | |
| 2006/0077260 A1 | 4/2006 | Pyo et al. | |
| 2007/0091181 A1 | 4/2007 | Serikawa et al. | |
| 2007/0154195 A1 | 7/2007 | Irisawa et al. | |

(Continued)

FOREIGN PATENT DOCUMENTS

EP    1 791 350 A2    5/2007

(Continued)

*Primary Examiner* — Ngoc-Yen Vu
(74) *Attorney, Agent, or Firm* — Dickstein Shapiro LLP

(57) ABSTRACT

The present invention aims to provide an imaging apparatus with blur correction function in which a retention lever to mechanically retain an image sensor requires a minimum moving space and the thickness of a lens barrel can be reduced in optical axis direction. The imaging apparatus includes an image sensor (7) photoelectrically converting an image of a subject into an electric signal; an optical photographic system (3) forming the subject image on an imaging plane of the image sensor (7); a lens barrel (4) containing the optical photographic system (3) and being extendable/retractable in an optical axis direction of the optical photographic system (3); a frame member (8, 11) movably supporting the image sensor (7) in a plane perpendicular to the optical axis; a blur correction unit (9) correcting a blur in the image due to hand shake by moving the frame member (8, 11) in a plane perpendicular to the optical axis; and a retainer unit (10) retaining the frame member (8, 11) in one of the optical axis direction and a direction perpendicular to the optical axis.

15 Claims, 23 Drawing Sheets

U.S. PATENT DOCUMENTS

2008/0043287 A1    2/2008    Shinohara et al.

FOREIGN PATENT DOCUMENTS

| | | |
|---|---|---|
| JP | 10-228044 A | 8/1998 |
| JP | 2992827 B | 10/1999 |
| JP | 3021352 B | 1/2000 |
| JP | 2001-004897 A | 1/2001 |
| JP | 2002-107784 A | 4/2002 |
| JP | 2002-116476 A | 4/2002 |
| JP | 2002-318402 A | 10/2002 |
| JP | 2003-241059 A | 8/2003 |
| JP | 3479461 B | 10/2003 |
| JP | 2004-54180 A | 2/2004 |
| JP | 2004-274242 A | 9/2004 |
| JP | 2004/294825 A | 10/2004 |
| JP | 2004-354879 A | 12/2004 |
| JP | 2005-294511 A | 10/2005 |
| JP | 2005-305841 A | 11/2005 |
| JP | 10-2006-0046749 A | 5/2006 |
| JP | 2006-309001 A | 11/2006 |
| JP | 2007/102062 A | 4/2007 |
| JP | 2007/114486 A | 5/2007 |
| KR | 2006-0032312 | 4/2006 |
| KR | 10-2006-0046749 A | 5/2006 |

* cited by examiner

IMAGING APPARATUS HAVING BLUR CORRECTION MECHANISM

CROSS REFERENCE TO RELATED APPLICATIONS

The present application is based on and claims priority from Japanese Patent Application No. 2007-068230, filed on Mar. 16, 2007, No. 2007-135116, filed on May 22, 2007, and No. 2007-263958, filed on Oct. 10, 2007, the disclosure of which is hereby incorporated by reference herein in its entirety.

TECHNICAL FIELD

The present invention relates to an imaging apparatus with a blur correction function to correct blurs due to camera or hand shake at shooting, such as a digital camera, a digital video camera (hereinafter, to be referred to as digital camera).

BACKGROUND ART

A digital camera generates digital images of a subject according to image signals from an image sensor (CCD or the like) which has received light from the image of the subject through an optical photographic system. In recent years, one having a blur correction to correct blurs due to camera shake at shooting has been widely spread.

For example, Japanese Laid-open Patent Application Publication No. 2004-274242 discloses a blur correction mechanism in a digital camera in which the image sensor (CCD or the like) is moved in accordance with a blur amount of a subject image caused by camera shake in a plane (X to Y plane) perpendicular to the optical axis direction of the optical photographic system.

Such a blur correction mechanism has a frame member on which the image sensor is arranged, and movably disposed in two directions (X to Y direction) orthogonal to each other and perpendicular to the optical axis direction. It corrects blurs in images by moving the frame member in accordance with a blur amount of a subject image to move the image sensor in a plane perpendicular to the optical axis direction.

However, this blur correction mechanism has a problem that since the moving of the frame member is controlled by supplying power to a driver (such as motor, piezo element) connected thereto, the power-off of the driver releases the blur correction function and makes the frame member freely movable, causing the center position of the image sensor on the frame member to be shifted from the optical axis due to disturbance such as gravity.

In order to prevent this problem, it is possible to supply power to the driver during the release of the blur correction for the purpose of controlling the center position of the image sensor on the frame member. However, this leads to another problem of extraneous power consumption.

In view of solving the above problems, the inventor of the present application has proposed an imaging apparatus which comprises a forcible original position retainer unit mechanically retaining a center position (original position) of the image sensor on the optical axis while the blur correction is turned off (disclosed in Japanese Laid-open Patent Application Publication No. 2005-305841, paragraph [0097], FIGS. 9, 12(a)). The forcible original position retainer unit includes a stepping motor (STM1), and a forcible holding plate (26) having a holding pin (33) attached to its end and reciprocatable in the optical axis direction by driving the stepping motor. In this imaging apparatus, the center position of the image sensor can be mechanically maintained on the optical axis during the turning-off of the blur correction by engaging a concave portion (19a) in the image sensor with the holding pin. Thus, the image sensor can be retained so that the center position thereof is positioned on the optical axis even during the turning-off of the driver for blur correction.

DISCLOSURE OF THE INVENTION

Problems to be Solved by the Invention

However, there is still a problem in the imaging apparatus of Japanese Laid-open Patent Application Publication No. 2005-305841 that since the forcible holding plate and the drive mechanism therefor are disposed on the back side (opposite to a subject side) of the image sensor, the holding plate moves in the optical axis direction during the release from holding the image sensor. Accordingly, there is a necessity for a space for the holding member to move on the back side thereof, which causes an increase of thickness of a lens barrel in the optical axis direction.

Means to Solve the Problems

In view of solving the above problem, an object of the present invention is to provide an imaging apparatus with a blur correction function which comprises a retention lever mechanically retaining the image sensor and requiring a minimum space to move, thereby enabling a reduction of thickness of a lens barrel in the optical axis direction.

According to one aspect of the present invention, the imaging apparatus is configured to comprise an image sensor photoelectrically converting an image of a subject into an electric signal;

an optical photographic system forming the image of the subject on an imaging plane of the image sensor; a lens barrel containing the optical photographic system and being extendable in a direction of an optical axis of the optical photographic system; a frame member movably supporting the image sensor in a plane perpendicular to the optical axis; a blur correction unit correcting a blur in the image due to hand shake by moving the frame member in a plane perpendicular to the optical axis; and a retainer unit retaining the frame member in one of the optical axis direction and a direction perpendicular to the optical axis.

Preferably, the imaging apparatus is configured to further comprise a base member disposed in a periphery of the frame member, in which the frame member has a recess; and the retainer unit comprises a retention lever mounted on the base member, extending to a periphery of the frame member and having, on one end thereof, a protrusion for engagement with the recess, and a driver unit moving the retention lever to engage the recess and protrusion and to release the engagement therebetween.

Preferably, the imaging apparatus is configured that the recess is provided on the frame member in the optical axis direction of the optical photographic system.

Preferably, the imaging apparatus is configured that the recess is provided on a subject side of the frame member; and when the lens barrel is ejected to the subject side, forming a predetermined space between the lens barrel and the frame member, the driver unit drives the retention lever to move the one end in the predetermined space in a substantial optical axis direction to release the engagement of the recess and protrusion.

Preferably, the imaging apparatus is configured that the recess is provided on the frame member on a side opposite to the subject side.

Preferably, the imaging apparatus is configured that the retainer unit further comprises a bias member biasing the retention lever; the retention lever has a support shaft in a middle portion in the direction perpendicular to the optical axis direction of the optical photographic system, and is movable around the support shaft and biased at the one end to the moving direction by the bias member; the driver unit comprises an operation shaft being movably retained in the optical axis direction and abutting with the other end of the retention lever, a cam member being provided around the operation shaft to convert a rotary movement thereof around the optical axis to a linear movement in the optical axis direction, and a rotary driver rotating the cam member; and the driver unit forwardly and reversely rotates the cam member by forward/reverse rotation of the rotary driver, thereby extending/shortening the operation shaft in the optical axis direction to move the other end of the retention lever to move the one end thereof.

Preferably, the imaging apparatus is configured that the retention lever is fixed at the other end in the base member; and the driver unit comprises an extendable actuator extending/shortening in the optical axis direction by electric power, and allows the actuator to extend to the other end of the retention lever in order to adjust pressure applied to the one end thereof to move the one end.

Preferably, the imaging apparatus is configured that the retention lever includes a support shaft at the other end in the direction perpendicular to the optical axis direction of the optical photographic system, and the one end thereof is movable around the support shaft and biased to the moving direction by the bias member; and the driver unit comprises an extendable actuator extending/shortening in the optical axis direction by electric power, and allows the actuator to extend to move the other end of the retention lever in order to move the one end thereof.

Preferably, the imaging apparatus is configured that the retention lever includes a support shaft in a middle portion in the direction perpendicular to the optical axis direction of the optical photographic system and two portions, one extending from the support shaft in the optical axis direction and the other extending from the support shaft in the direction perpendicular to the optical axis direction; the other portion of the retention lever is bent to the optical axis direction of the optical photographic system and movable around the support shaft, and the one portion thereof is biased to the moving direction by the bias member; and
the driver unit comprises an extendable actuator extending/shortening in the direction perpendicular to the optical axis direction by electric power, and allows the actuator to extend to move the other portion of the retention lever in order to move the one portion thereof.

Preferably, the imaging apparatus is configured that the retention lever includes a guide hole in the moving direction and the base member includes a guide pin insertable into the guide hole.

Preferably, the imaging apparatus is configured to further comprise a bias member biasing the retention lever in the direction perpendicular to the moving direction.

According to another aspect of the present invention, the imaging apparatus is configured to comprise an image sensor photoelectrically converting an image of a subject into an electric signal; an optical photographic system forming the image of the subject on an imaging plane of the image sensor; a lens barrel containing the optical photographic system and being extendable in a direction of an optical axis of the optical photographic system; a frame member movably supporting the image sensor in a plane perpendicular to the optical axis; a blur correction unit correcting a blur in the image due to hand shake by moving the frame member in a plane perpendicular to the optical axis; and a retainer unit retaining the frame member in one of the optical axis direction and a direction perpendicular to the optical axis.

Preferably, the imaging apparatus is configured to further comprise a base member disposed in a periphery of the frame member, in which the frame member has a recess; and the retainer unit comprises a retention lever mounted on the base member, extending to a periphery of the frame member and having, on one end thereof, a protrusion for engagement with the recess, and a driver unit moving the retention lever to engage the recess and protrusion and to release the engagement therebetween.

Preferably, the imaging apparatus is configured that the recess is provided on the frame member in the direction perpendicular to the optical axis direction of the optical photographic system.

Preferably, the imaging apparatus is configured that the frame member comprises a first frame member moving in a first direction in a plane perpendicular to the optical axis direction of the optical photographic system and having the recess in the direction perpendicular to the optical axis direction, and a second frame member moving in a second direction perpendicular to the first direction and having the recess in the direction perpendicular to the optical axis direction; and the retention lever comprises a first retention lever retaining the first frame member and a second retention lever retaining the second frame member.

Preferably, the imaging apparatus is configured that the retention lever includes a support shaft in a middle portion in the direction perpendicular to the optical axis direction of the optical photographic system, is movable around the support shaft and biased at the one end to the moving direction by the bias member; and the driver unit comprises an extendable actuator extending/shortening in the direction perpendicular to the optical axis direction by electric power, and allows the actuator to extend to move the other end of the retention lever in order to move the one end thereof.

Preferably, the imaging apparatus is configured that a length from the support shaft to the one end of the retention lever is longer than a length from the support shaft to the other end thereof.

Preferably, the imaging apparatus is configured that the retention lever includes a guide hole in the moving direction and the base member includes a guide pin insertable into the guide hole.

Preferably, the imaging apparatus is configured to further comprise a bias member biasing the retention lever in the direction perpendicular to the moving direction.

According to another aspect of the present invention, the imaging apparatus is configured to comprise an image sensor photoelectrically converting an image of a subject into an electric signal; an optical photographic system forming the image of the subject on an imaging plane of the image sensor; a lens barrel containing the optical photographic system and being extendable in a direction of an optical axis of the optical photographic system; a frame member movably supporting the image sensor in a plane perpendicular to the optical axis; a blur correction unit correcting a blur in the image due to hand shake by moving the frame member in a plane perpendicular to the optical axis; and a retainer unit retaining the frame member in one of the optical axis direction and a direction perpendicular to the optical axis.

Preferably, the imaging apparatus is configured to further comprise a base member disposed in a periphery of the frame member, in which the frame member has a recess; and the retainer unit comprises a retention lever mounted on the base member, extending to a periphery of the frame member and having, on one end thereof, a protrusion for engagement with the recess, and a driver unit moving the retention lever to engage the recess and protrusion and to release the engagement therebetween.

Preferably, the imaging apparatus is configured that the recess is formed to have an inclined inner wall such that it widens from a bottom to an opening thereof.

Advantageous Effect of the Invention

According to one preferable embodiment of the present invention, the imaging apparatus is configured to comprise an image sensor photoelectrically converting an image of a subject into an electric signal; an optical photographic system forming the image of the subject on an imaging plane of the image sensor; a lens barrel containing the optical photographic system and being extendable/retractable in a direction of an optical axis of the optical photographic system; a frame member movably supporting the image sensor in a plane perpendicular to the optical axis; a blur correction unit correcting a blur in the image due to hand shake by moving the frame member in a plane perpendicular to the optical axis; and a retainer unit retaining the frame member in one of the optical axis direction and a direction perpendicular to the optical axis.

With such a configuration, the frame member to retain the image sensor can be properly retained.

Preferably, the imaging apparatus is configured to further comprise a base member disposed in a periphery of the frame member, in which the frame has a recess; and the retainer unit comprises a retention lever mounted on the base member, extending to a periphery of the frame member and having, on the one end, a protrusion for engagement with the recess, and a driver unit moving the retention lever to engage the recess and protrusion and to release the engagement therebetween.

With such a configuration, the frame member is mechanically retained by the retention lever so that the frame member is retained at a predetermined position without electric power consumption.

Further, preferably, the imaging apparatus is configured that the recess is provided on the frame member in the optical axis direction of the optical photographic system.

Preferably, the imaging apparatus is configured that the recess is provided on a subject side of the frame member; and when the lens barrel is ejected to the subject side, forming a predetermined space between the lens barrel and the frame member, the driver unit drives the retention lever to move the one end in the predetermined space in a substantial optical axis direction to release the engagement of the recess and protrusion.

With the above configuration, it is possible to eliminate the necessity of the space for the retention lever to move in the frame member on an opposite side to the subject side, thereby realizing reduction of the thickness of the lens barrel in the optical axis direction. Also, it makes easier to retain the frame member and release the retention thereof.

Preferably, the imaging apparatus is configured that the recess is provided on the frame member on the side opposite to the subject side. This makes easier to retain the frame member and release the retention thereof.

Preferably, the imaging apparatus is configured that the retainer unit further comprises a bias member biasing the retention lever; the retention lever has a support shaft in a middle portion in the direction perpendicular to the optical axis direction of the optical photographic system, and is movable around the support shaft and biased at the one end to the moving direction by the bias member; and the driver unit comprises an operation shaft being movably retained in the optical axis direction and abutting with the other end of the retention lever, a cam member being provided around the operation shaft to convert a rotary movement thereof around the optical axis to a linear movement in the optical axis direction, and a rotary driver rotating the cam member; and the driver unit forwardly and reversely rotates the cam member by forward/reverse rotation of the rotary driver, thereby extending/shortening the operation shaft in the optical axis direction to move the other end of the retention lever to move the one end thereof.

With such a configuration, the operation shaft can be extended/shortened in a simple structure to retain the frame member and release the retention thereof.

Preferably, the imaging apparatus is configured that the retention lever is fixed at the other end in the base member; and the driver unit comprises an extendable actuator extending/shortening in the optical axis direction by electric power, and allows the actuator to extend to the other end of the retention lever in order to adjust pressure applied to the one end thereof to move the one end.

With such a configuration, it is possible to simplify the structure of the driver unit and reduce the size thereof, which results in facilitating assembly adjustment thereof and further reducing the thickness thereof in the photographic optical axis direction.

Furthermore, since the retention unit as configured above does not need to consume electric power for conversion of rotary movements to linear movements, it is possible to achieve more power saving than a retention structure having a rotary driver and a cam member. Also, it can be made in a simple structure, thereby reducing a space for provision thereof.

Moreover, for manufacturing the retention structure with a rotary driver and a cam member, it is necessary to perform a final position adjustment process for correcting a displacement of the image sensor in the optical axis direction which has occurred at assembling the retention lever into the cam member. With the retention unit as configured above, the final position adjustment process can be simplified by appropriately setting the design sizes of the extendable actuator and retention lever. Also, it is made possible to improve robustness of the imaging apparatus due to uncertain factors such as disturbance, designing errors.

Further, with use of the retention lever made of flexible material, it is possible to further simplify the structure of the retention unit.

Preferably, the imaging apparatus is configured that the retention lever includes a support shaft at the other end in a direction perpendicular to the optical axis direction of the optical photographic system, and the one end thereof is movable around the support shaft and biased to the moving direction by the bias member; and the driver unit comprises an extendable actuator extending/shortening in the optical axis direction by electric power, and allows the actuator to extend to move the other end of the retention lever in order to move the one end thereof.

With such a configuration, it is possible to simplify the structure of the driver unit and reduce the size thereof, which results in facilitating assembly adjustment thereof and further reducing the thickness thereof in the photographic optical axis direction.

Furthermore, since the retention unit as configured above does not need to consume electric power for conversion of rotary movements to linear movements, it is possible to achieve more power saving than a retention structure having a rotary driver and a cam member. Also, it can be made in a simple structure, thereby reducing a space for provision thereof.

Moreover, for manufacturing the retention structure with a rotary driver and a cam member, it is necessary to perform a final position adjustment process for correcting a displacement of the image sensor in the optical axis direction which has occurred at assembling the retention lever into the cam member. With the retention unit as configured above, the final position adjustment process can be simplified by appropriately setting the design sizes of the extendable actuator and retention lever. Also, it is made possible to improve robustness of the imaging apparatus due to uncertain factors such as disturbance, designing errors.

Preferably, the imaging apparatus is configured that the retention lever includes a support shaft in a middle portion in the direction perpendicular to the optical axis direction of the optical photographic system and two portions, one extending from the support shaft in the optical axis direction and the other extending from the support shaft in the direction perpendicular to the optical axis direction; the other portion of the retention lever is bent to the optical axis direction of the optical photographic system and movable around the support shaft, and the one portion thereof is biased to the moving direction by the bias member; and the driver unit comprises an extendable actuator extending/shortening in the direction perpendicular to the optical axis direction by electric power, and allows the actuator to extend to move the other portion of the retention lever in order to move the one portion thereof.

With such a configuration, it is possible to simplify the structure of the driver unit and reduce the size thereof, which results in facilitating assembly adjustment thereof and further reducing the thickness thereof in the photographic optical axis direction.

Furthermore, since the retention unit as configured above does not need to consume electric power for conversion of rotary movements to linear movements, it is possible to achieve more power saving than a retention structure having a rotary driver and a cam member. Also, it can be made in a simple structure, thereby reducing a space for provision thereof.

Moreover, for manufacturing the retention structure with a rotary driver and a cam member, it is necessary to perform a final position adjustment process for correcting a displacement of the image sensor in the optical axis direction which has occurred at assembling the retention lever into the cam member. With the retention unit as configured above, the final position adjustment process can be simplified by appropriately setting the design sizes of the extendable actuator and retention lever. Also, it is made possible to improve robustness of the imaging apparatus due to uncertain factors such as disturbance, designing errors.

Furthermore, with such a configuration, an extendable actuator in a longer overall length can be disposed compared to one extending/shortening in the photographic optical axis direction. Accordingly, with a relatively small applied voltage, a large amount of extension can be obtained. This results in electric power saving when the displacement of the retention lever is unchanged, and a large displacement of the retention lever when the applied voltage is unchanged.

Preferably, the imaging apparatus is configured that the retention lever includes a guide hole in the moving direction and the base member includes a guide pin insertable into the guide hole.

Further, preferably, the imaging apparatus is configured to further comprise a bias member biasing the retention lever in a direction perpendicular to the moving direction.

With such a configuration, it is possible to prevent a shakiness of the retention lever in the direction perpendicular to its moving direction.

According to another aspect of the present invention, the imaging apparatus is configured to comprise an image sensor photoelectrically converting an image of a subject into an electric signal; an optical photographic system forming the image of the subject on an imaging plane of the image sensor; a lens barrel containing the optical photographic system and being extendable/retractable in a direction of an optical axis of the optical photographic system; a frame member movably supporting the image sensor in a plane perpendicular to the optical axis; a blur correction unit correcting a blur in the image due to hand shake by moving the frame member in a plane perpendicular to the optical axis; and a retainer unit retaining the frame member in one of the optical axis direction and a direction perpendicular to the optical axis.

With such a configuration, the frame member to retain the image sensor can be properly retained.

Preferably, the imaging apparatus can be configured to further comprise a base member disposed in a periphery of the frame member, in which the frame has a recess; and the retainer unit comprises a retention lever mounted on the base member, extending to a periphery of the frame member and having, on the one end, a protrusion for engagement with the recess, and a driver unit moving the retention lever to engage the recess and protrusion and to release the engagement therebetween.

With such a configuration, the frame member is mechanically retained by the retention lever so that the frame member is retained at a predetermined position without electric power consumption.

Preferably, the imaging apparatus is configured that the recess is provided in the frame member in the direction perpendicular to the optical axis direction of the optical photographic system.

Further, preferably, the imaging apparatus is configured that the frame member comprises a first frame member moving in a first direction in a plane perpendicular to the optical axis direction of the optical photographic system and having the recess in the direction perpendicular to the optical axis direction, and a second frame member moving in the second direction perpendicular to the first direction and having the recess in a direction perpendicular to the optical axis direction and; the retention lever comprises a first retention lever retaining the first frame member and a second retention lever retaining the second frame member.

With such a configuration, it is possible to eliminate the necessity of a space for moving the retention lever towards an opposite side to the subject side and to reduce the thickness of the lens barrel in the optical axis direction. Also, it makes easier to retain the frame member and release the retention thereof.

Furthermore, with such a configuration, the first frame member is retained by the first retention lever in the first direction in a plane perpendicular to the optical axis direction of the optical photographic system while the second frame member is retained by the second retention lever in the second direction perpendicular to the first direction. Thereby, the image sensor can be prevented from being displaced in the photographic optical axis direction.

Preferably, the imaging apparatus is configured that the retention lever includes a support shaft in a middle portion in the direction perpendicular to the optical axis direction of the optical photographic system, and is movable around the support shaft and biased at the one end to the moving direction by the bias member; and the driver unit comprises an extendable actuator extending/shortening in the direction perpendicular to the optical axis direction by electric power, and allows the actuator to extend to move the other portion of the retention lever in order to move the one portion thereof.

With such a configuration, it is possible to simplify the structure of the driver unit and reduce the size thereof, which results in facilitating assembly adjustment thereof and further reducing the thickness thereof in the photographic optical axis direction.

Furthermore, since the retention unit as configured above does not need to consume electric power for conversion of rotary movements to linear movements, it is possible to achieve more power saving than a retention structure having a rotary driver and a cam member. Also, it can be made in a simple structure, thereby reducing a space for provision thereof.

Moreover, for manufacturing the retention structure with a rotary driver and a cam member, it is necessary to perform a final position adjustment process for correcting a displacement of the image sensor in the optical axis direction which has occurred at assembling the retention lever into the cam member. With the retention unit as configured above, the final position adjustment process can be simplified by appropriately setting the design sizes of the extendable actuator and retention lever. Also, it is made possible to improve robustness of the imaging apparatus due to uncertain factors such as disturbance, designing errors.

It is also possible to determine positional relationship between the retention lever and extendable actuator with a higher degree of freedom.

Furthermore, with such a configuration, an extendable actuator in a longer overall length can be disposed compared to one extending/shortening in the photographic optical axis direction. Accordingly, with a relatively small applied voltage, a large amount of extension can be obtained. This results in electric power saving when the displacement of the retention lever is unchanged, and a large displacement of the retention lever when the applied voltage is unchanged.

Preferably, the imaging apparatus is configured that a length from the support shaft to the one end of the retention lever is longer than a length from the support shaft to the other end thereof.

With such a configuration, it is possible to obtain a large displacement of the retention lever by a small amount of extension. Accordingly, even with use of a piezo element having a small extension property for the extendable actuator, the retention lever can be largely displaced.

More preferably, the imaging apparatus is configured that the retention lever includes a guide hole in the moving direction and the base member includes a guide pin insertable into the guide hole.

Preferably, the imaging apparatus is configured to further comprise a bias member biasing the retention lever in a direction perpendicular to the moving direction thereof.

With such a configuration, it is possible to prevent shakiness of the retention lever in the direction perpendicular to the moving direction.

According to another aspect of the present invention, the imaging apparatus is configured to comprise an image sensor photoelectrically converting an image of a subject into an electric signal; an optical photographic system forming the image of the subject on an imaging plane of the image sensor; a lens barrel containing the optical photographic system and being extendable/retractable in a direction of an optical axis of the optical photographic system; a frame member movably supporting the image sensor in a plane perpendicular to the optical axis; a blur correction unit correcting a blur in the image due to hand shake by moving the frame member in a plane perpendicular to the optical axis; and a retainer unit retaining the frame member in one of the optical axis direction and a direction perpendicular to the optical axis.

With such a configuration, the frame member to retain the image sensor can be properly retained.

Preferably, the imaging apparatus can be configured to further comprise a base member disposed in a periphery of the frame member, in which the frame has a recess; and the retainer unit comprises a retention lever mounted on the base member, extending to a periphery of the frame member and having, on the one end, a protrusion for engagement with the recess, and a driver unit moving the retention lever to engage the recess and protrusion and to release the engagement therebetween.

With such a configuration, the frame member is mechanically retained by the retention lever so that the frame member is retained at a predetermined position without electric power consumption.

Preferably, the imaging apparatus is configured that the recess is formed to have an inclined inner wall such that it widens from a bottom to an opening thereof.

With such a configuration, the protrusion can be smoothly engaged with the recess.

BEST MODE FOR CARRYING OUT THE INVENTION

Hereinafter, the present invention will be described with reference to the accompanying drawings.

First Embodiment

Figure 1:
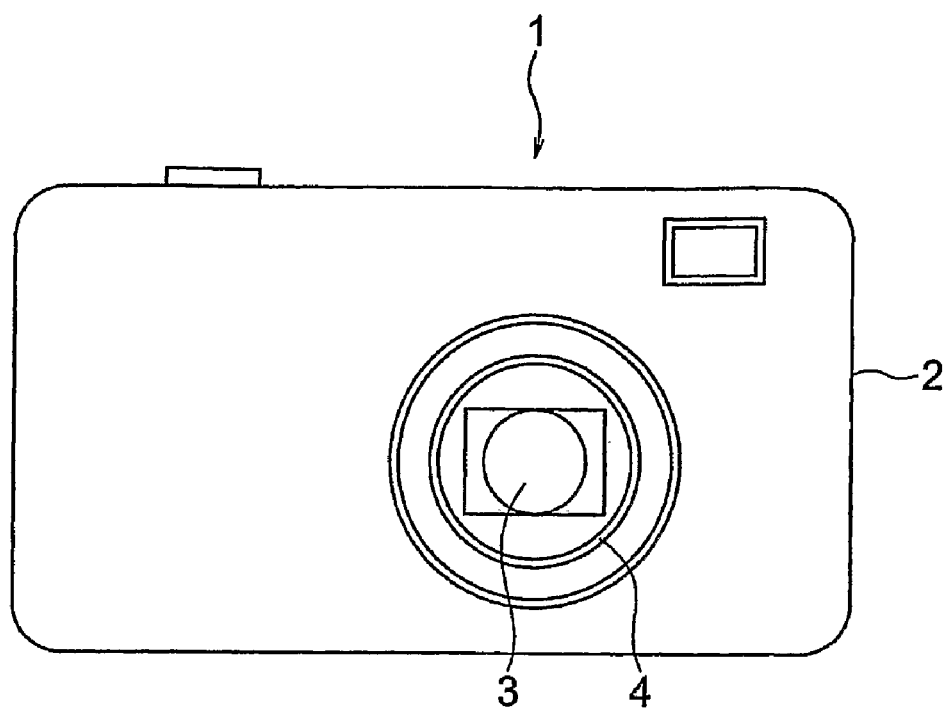
FIG. 1 is a front view of a digital camera as an example of the imaging apparatus according to a first embodiment of the present invention.

FIG. 1 is a front view of a digital camera 1 as an example of the imaging apparatus according to the first embodiment of the present invention. The digital camera has a blur correction function to correct blurs in images by moving the image sensor in a plane perpendicular to the optical axis direction.

As shown in FIG. 1, the digital camera 1 comprises a lens barrel 4 containing an optical photographic system 3 (including a photographic lens 105 of FIG. 20, an imaging lens and so on but not shown in FIG. 1) on the front surface of a camera body 2. The lens barrel 4 is movable along the optical axis of the optical photographic system 3 (hereinafter, to be referred to as optical axis) between a predetermined retreated position and a predetermined photographic standby position. The optical photographic system 3 includes not-shown fixed lens, zoom lens, focus lens, and the like. The lens barrel 4 contains a shutter unit, an aperture diaphragm unit and so on in addition to the optical photographic system 3.

Figure 2:
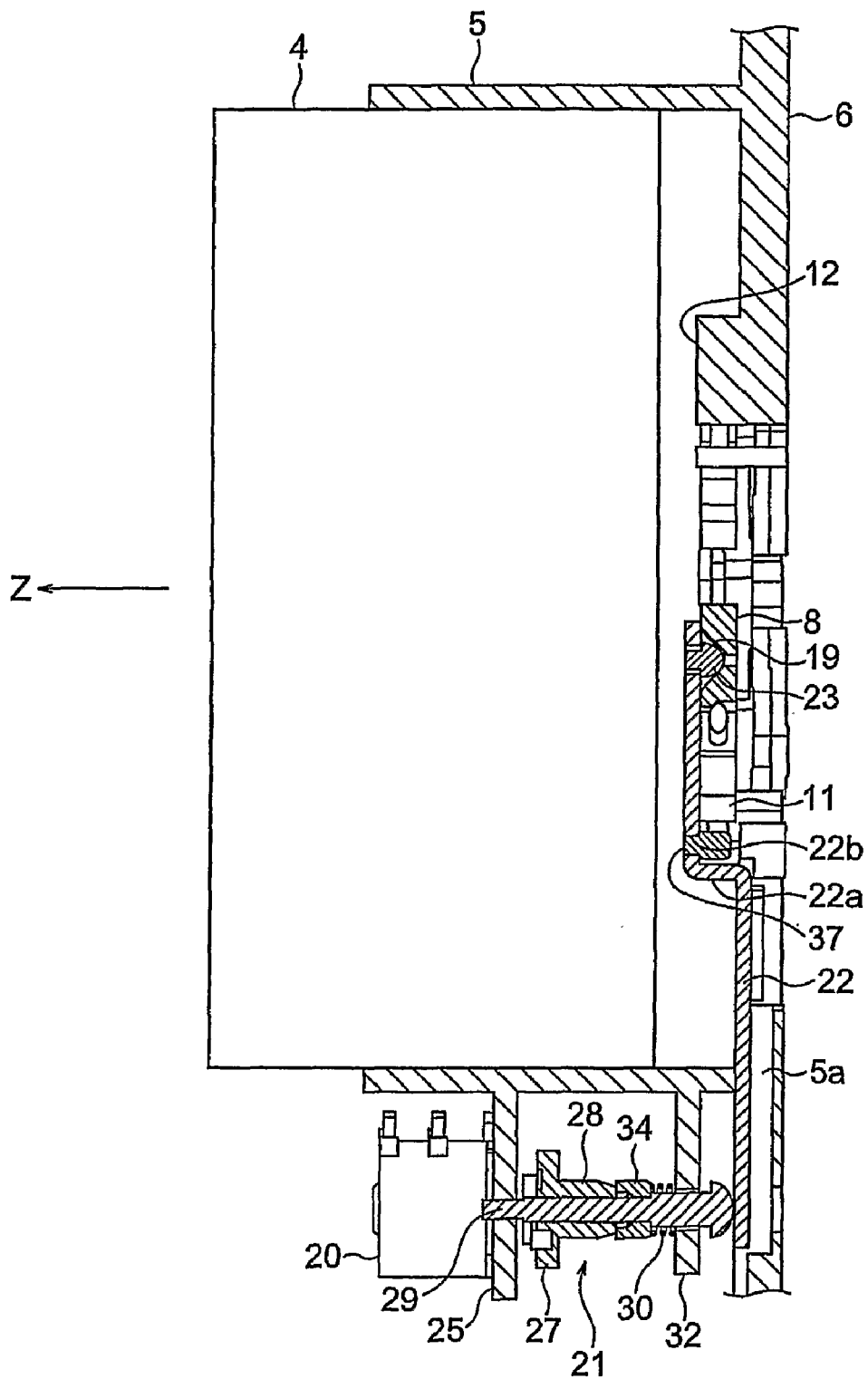
FIG. 2 is a cross sectional side view of a lens barrel at a retracted position in a tubular lens barrel container of the digital camera according to the first embodiment of the present invention.

FIG. 2 is a cross sectional side view of the lens barrel 4 which is disposed inside a tubular lens barrel container 5. The lens barrel container 5 is integrated with a front surface of a base plate 6 disposed in the camera body 2. A not-shown helicoidal cam groove is formed on an inner circumference of the lens barrel container 5, and a not-shown helicoidal cam follower is formed on an outer circumference of the lens barrel 4. The cam follower is engaged with the cam groove, allowing the lens barrel 4 to move in the optical axis (Z axis) direction between the predetermined retreated position and predetermined standby position by a drive force of a not-shown lens barrel drive unit. FIG. 2 shows the lens barrel 4 at the retreated position in the lens barrel container 5.

Figure 3:
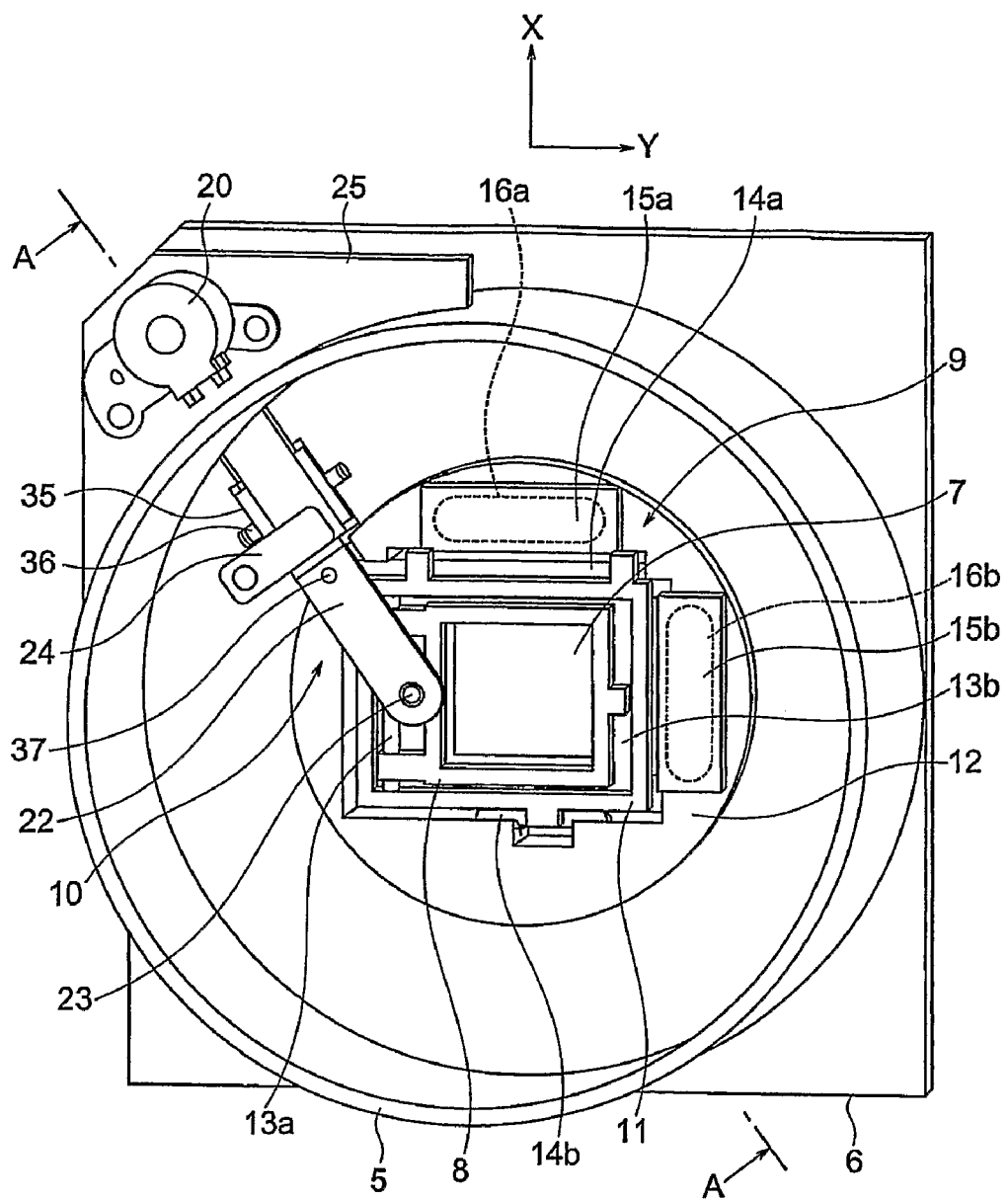
FIG. 3 is a schematic perspective view of a front side of a base plate of the digital camera according to the first embodiment of the present invention.
Figure 4:
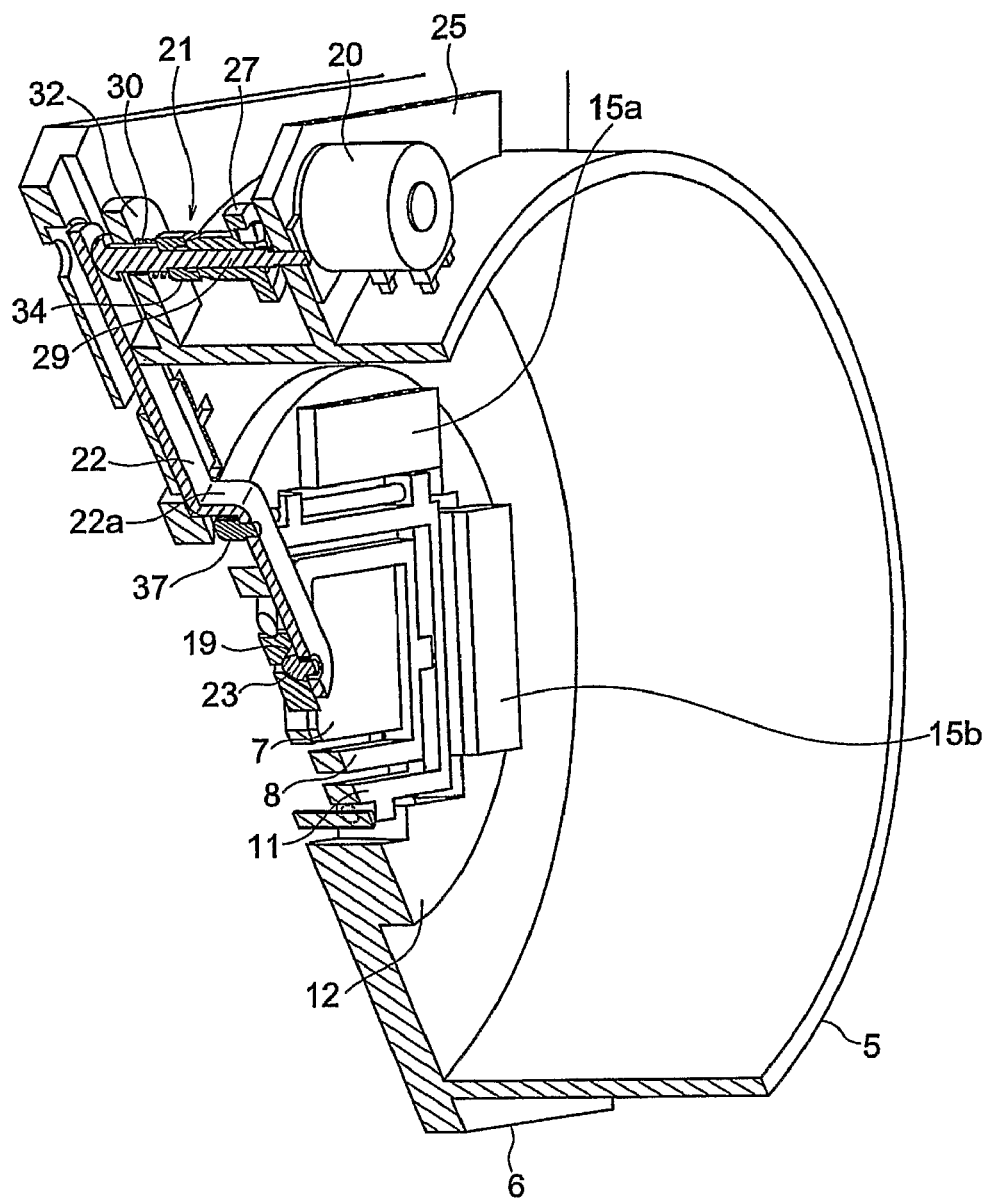
FIG. 4 is a cross sectional view of the base plate along the A to A line of FIG. 3.
Figure 5:
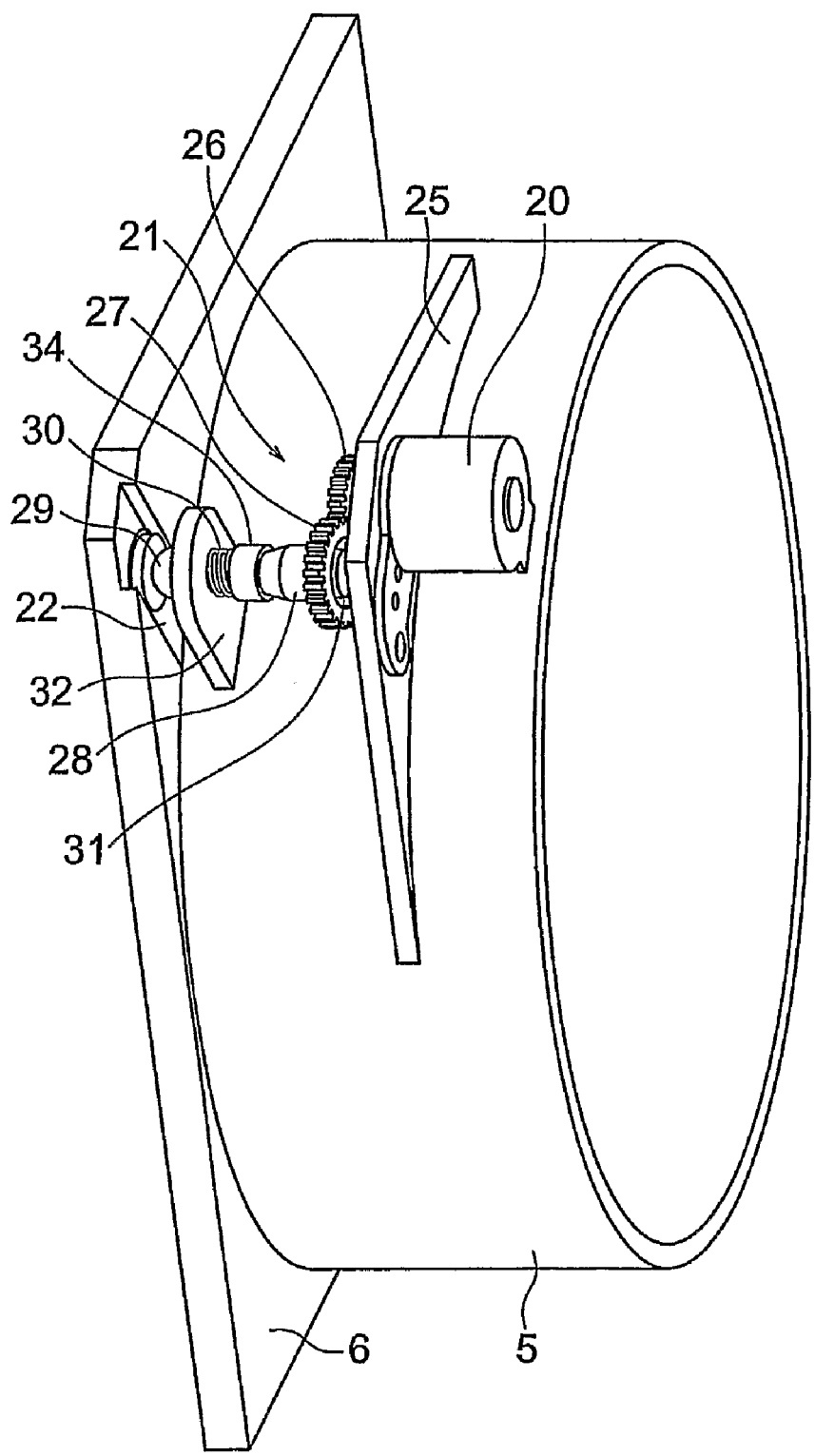
FIG. 5 is a perspective view of the lens barrel container integrated with the base plate in the digital camera according to the first embodiment of the present invention.

FIG. 3 is a schematic perspective view of the front surface of the base plate 6, and FIG. 4 is a cross sectional view thereof along the A to A line. FIG. 5 is a perspective view of the exterior of the lens barrel container 5 integrated with the base plate 6. Note that FIGS. 3 to 5 omit showing the lens barrel 4 in the lens barrel container 5.

As shown in FIG. 3, the base plate 6 is placed at the center of the lens barrel container 5. On the base plate, placed are an image sensor support frame 8 supporting an image sensor 7 as CCD, a blur correction unit 9 to correct blurs in images by moving the image sensor support frame 8 in a plane perpendicular to the optical axis direction, and a retainer unit 10 mechanically retaining the image sensor support frame 8 to restrict the movement thereof.

(Configuration of Blur Correction Unit 9)

The blur correction unit 9 comprises a slide frame 11 which movably holds the image sensor support frame 8 and is movably supported in a slide frame support frame 12 on the base plate of the lens barrel container 5. The image sensor support frame 8 is inserted through a pair of guide bars 13a, 13b provided in the slide frame 11 to be movably held in X-axis direction (vertical direction in FIG. 3). The slide frame 11 is inserted through a pair of guide bars 14a, 14b provided in the slide frame support frame 12 to be movably held in Y-axis direction (horizontal direction in FIG. 3). The image sensor support frame 8 and the slide frame 11 are equivalent to the frame member.

Magnets 15a, 15b integrally molded with yokes are disposed on the slide frame support frame 12 so as to be adjacent to the slide frame 11 in the Y-axis and X-axis directions, respectively. Coils 16a, 16b are disposed on the back side of the magnets 15a, 15b, facing thereto. The coil 16a is fixed at a not-shown protrusion of the slide frame 11 while the coil 16b is fixed at a not-shown protrusion of the image sensor support frame 8.

A flow of electric current to the coil 16a, 16b generates respective magnetic fields and attraction/repulsion between the coil 16a and the magnet 15a and between the coil 16b and the magnet 15b. By controlling the flow of electric current, the image sensor support frame 8 and the slide frame 11 can be moved in the X-axis and Y-axis directions, respectively. Note that the image sensor support frame 8 and the slide frame 11 are provided with a not-shown position detection element as a hall element to detect positions thereof.

The blur correction unit 9 controls the electric current applied to the coils 16a, 16b based on blur detection information which is obtained by a not-shown gyrosensor or the like in the camera body 2, thereby generating the attraction/repulsion from the magnetic fields between the coil 16a and the magnet 15a and between the coil 16b and the magnet 15b. The blur correction unit 9 performs the blur correction by moving the image sensor support frame 8 in the X-axis direction and the slide frame 11 in the Y-axis direction using attraction/repulsion due to the magnetic fields to negate blurs.

Figure 6:
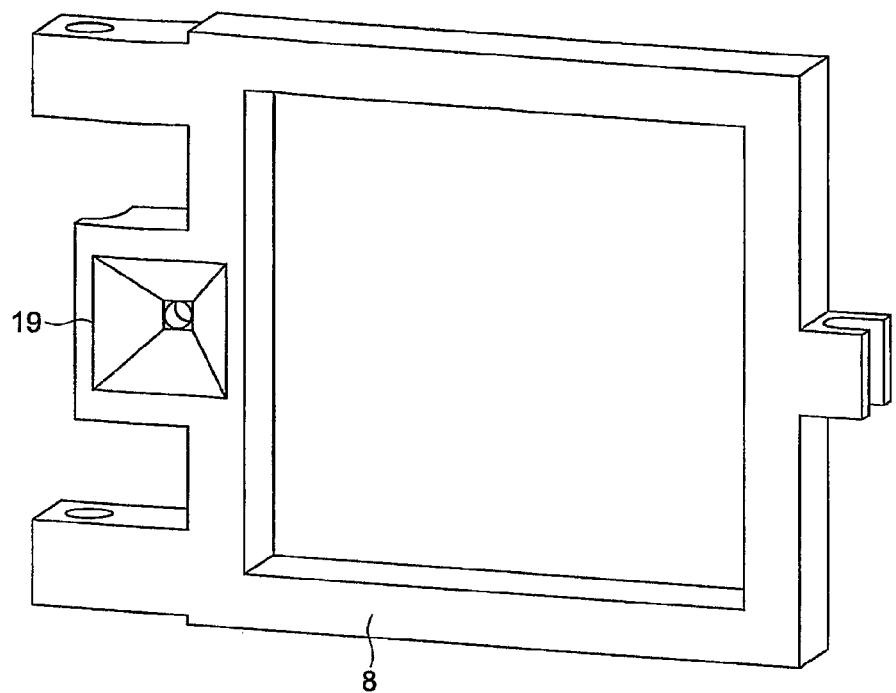
FIG. 6 is a perspective view of an image sensor support frame for the image sensor in the digital camera according to the first embodiment of the present invention.

Further, as shown in FIG. 6, a recess 19 with a square opening end and a square bottom is formed on the front surface of the image sensor support frame 8 (front surface of the image sensor 7), to be detachably engaged with a protrusion 23 (in FIGS. 2 to 4) provided at the edge of a later-described retention lever 22. The recess 19 has such an inclined inner wall to be widened from the bottom towards the opening end on the subject side.

Figure 7:
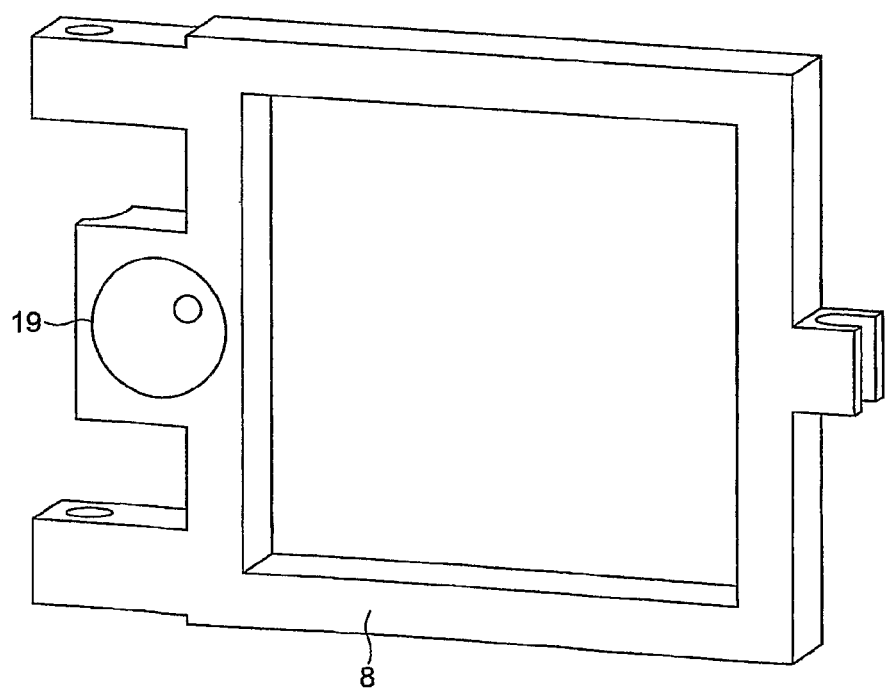
FIG. 7 is a perspective view of another image sensor support frame for the image sensor in the digital camera according to the first embodiment of the present invention.

Regarding the shape of the recess 19, it can have a round bottom and a round opening end to form such an inclined inner wall to be widened from the bottom to the opening end, as shown in FIG. 7 for example.

(Configuration of Retainer Unit 10)

The retainer unit 10 comprises a drive motor 20, a reciprocation mechanism 21 converting rotary movement of the drive motor 20 to a linear reciprocative movement, a retention lever of a thin plate 22 (equivalent to the forcible holding plate above) moving along with reciprocative movements of the reciprocation mechanism 21 and having a protrusion 23 at one end to be detachably engaged with the recess 19, a blade spring member 24 (FIG. 3) biasing the one end of the retention lever 22 (protrusion 23 side) to the image sensor support frame 8.

The drive motor 20 such as a stepping motor is supported by a motor flange 25 integrally formed with the outer surface of the lens barrel container 5 (FIGS. 3 and 4). An output gear 26 is fixed to a motor shaft (output shaft) of the drive motor 20 and is coupled with the reciprocation mechanism 21 (FIG. 5).

Figure 8:
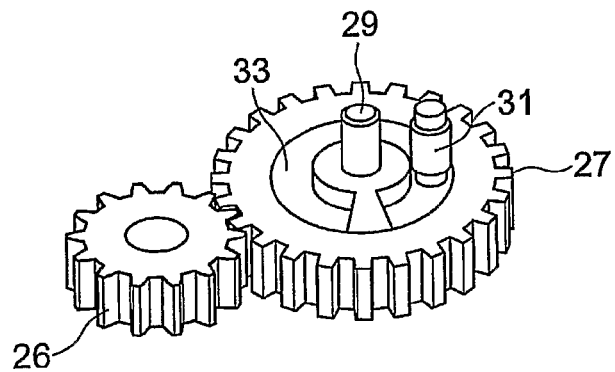
FIG. 8 is a perspective view of a rotation transfer gear of the digital camera according to the first embodiment of the present invention.

The reciprocation mechanism 21, as shown in FIGS. 2, 4, 5, 8, comprises a gear portion 28 having a rotation transfer gear 27 engaged with the output gear 26, an operation shaft 29 inserting through a shaft hole of the gear portion 28 and being movable in the optical axis direction, a bias spring 30 being provided on the outer surface of the operation shaft 29, and a cam follower 31 (FIG. 8). The operation shaft 29 is disposed in the optical axis direction (Z direction in FIG. 2), and movably supported at one end (drive motor 20 side) in the optical axis direction by the motor flange 25 and at the other end (retention lever 22 side) in the optical axis direction by an shaft support plate 32 which is integrated with the outer surface of the lens barrel container 5.

Figure 9A:
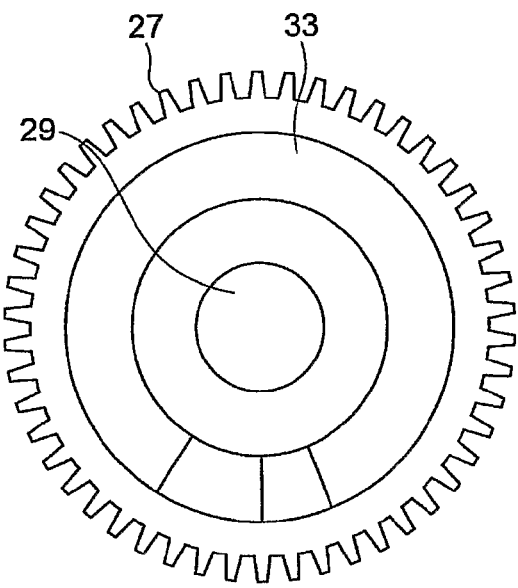
FIG. 9A is a plain view of the rotation transfer gear of the digital camera according to the first embodiment of the present invention.
Figure 9B:
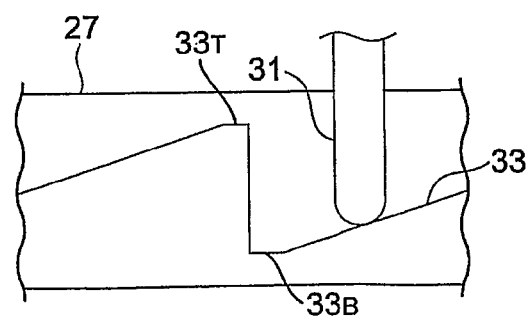
FIG. 9B is a cross sectional view thereof.

In FIGS. 9A, 9B, the rotation transfer gear 27 has a cam plane 33 inside to abut with the cam follower 31 attached to the motor flange 25. The movement of the rotation transfer gear 27 is restricted in the optical axis direction by a gear bearing 34 mounted on a shaft support plate 32 side of the operation shaft 29. Also, the rotation transfer gear 27 is biased to the motor flange 25 by the bias spring 30 between the shaft support plate 32 and the gear bearing 34. As above, the cam plane 33 of the rotation transfer gear 27 constantly abuts with the cam follower 31.

As seen from the optical photographic system 3, the retention lever 22 is linearly formed and disposed along the surface of the base plate 6 and slide frame support frame 12 through an opening 5a formed on a base end of the lens barrel container 5. The retention lever 22 is movably supported at around the middle portion by a moving shaft 36 (FIG. 3) which is supported by a bearing member 35 on the base plate 6. Note that FIGS. 2, 4 omit showing the bearing member 35, moving shaft 36, and blade spring member 24.

One end of the retention lever 22 extends to about the recess 19 of the image sensor support frame 8 via a step 22a, and have the protrusion 23 fixed to be detachably engaged with the recess 19. The tip of the protrusion 23 is formed in substantially spherical shape. The other end of the retention lever 22 abuts with the end of the operation shaft 29.

The upper surface of the retention lever 22 is biased towards the base plate 6 by the blade spring member 24 at a position a little closer to the one end than the moving shaft 36. The opposite end of the blade spring member 24 is fixed on the base plate 6. Also, the retention lever 22 has a step 22a at a position a little closer to the one end than the guide hole 22b, and the base plate 6 has a guide pin 37 to be detachably fitted with the guide hole 22b (FIGS. 2, 3).

Next, operation of the retainer unit 10 to retain the image sensor support frame 8 to restrict the movement thereof will be described.

As shown in FIG. 2, the lens barrel 4 is positioned at the retreated position in the lens barrel container 5 while a not-shown power switch of the digital camera 1 (FIG. 1) is turned off (not-shown blur correction switch to actuate the blur correction unit 9 is also turned off). In this state, the rotation transfer gear 27 engaging with output gear 26 is rotated counterclockwise by the clockwise rotation of the drive motor 20, thereby controlling the edge of the cam follower 31 to get in contact with a bottom 33B (FIG. 9) of the cam plane 33.

Here, the rotation transfer gear 27 (gear portion 28) and the operation shaft 29 are moved towards the motor flange 25 by a biasing force of the bias spring 30 so that the end of the operation shaft 29 does not press the upper surface of the bottom end of the retention lever 22.

Accordingly, the one end of the retention lever is biased towards the base plate 6 (right side in FIG. 2) by the blade spring member 24, allowing the protrusion 23 to engage with the recess on the image sensor support frame 8. This makes it possible to mechanically fix the image sensor support frame 8 in such a manner as to position the center of the image sensor 7 on the optical axis, and restrict the movement of the image sensor support frame 8, that is, the image sensor 7.

Figure 10:
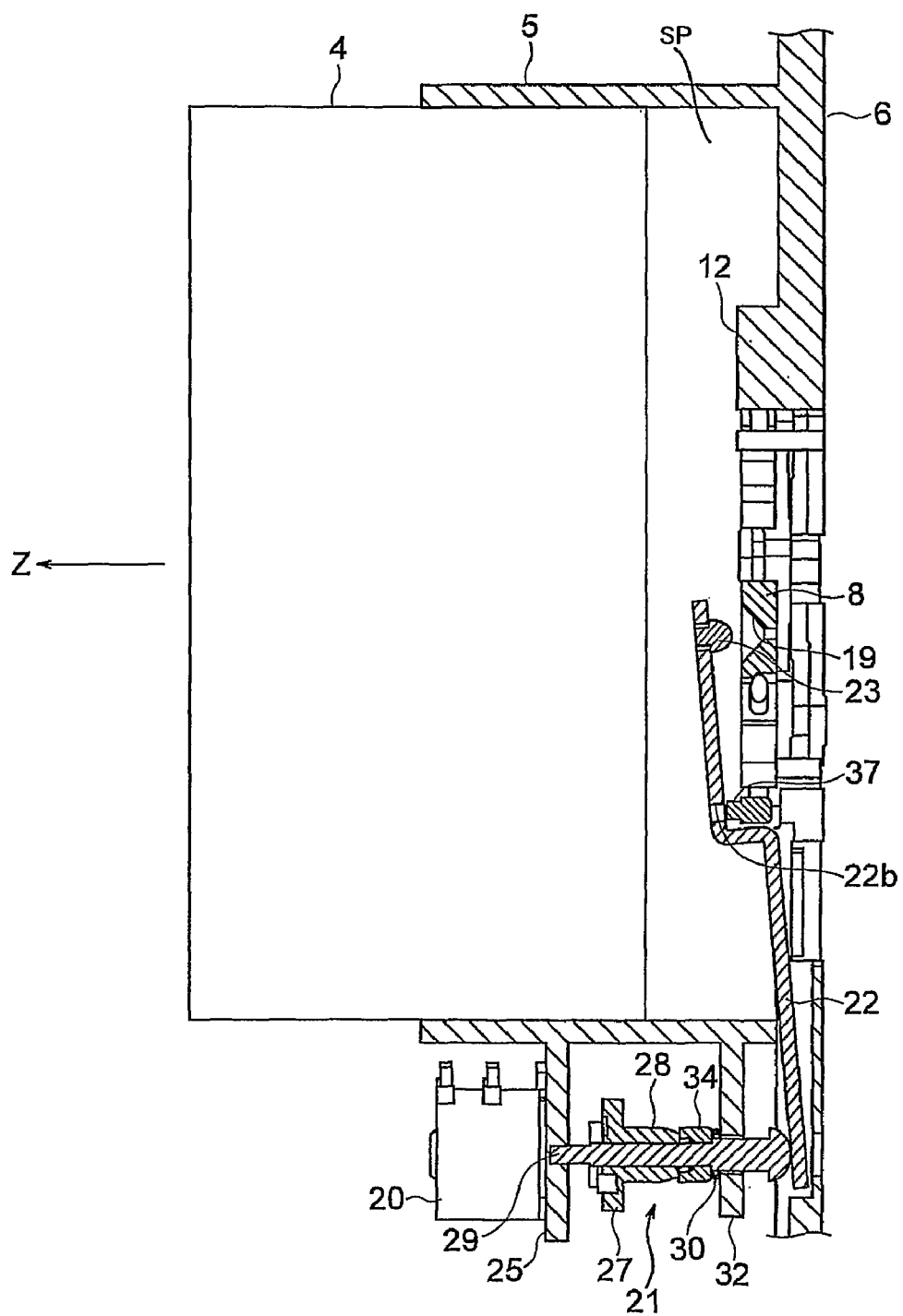
FIG. 10 is cross sectional side view of the lens barrel ejected from the lens barrel container of the digital camera according to the first embodiment of the present invention.

Meanwhile, as shown in FIG. 10, at turning on the power switch of the digital camera 1, a drive mechanism moves the lens barrel 4 forward from the retreated position (in FIG. 2) in the lens barrel container 5 to the standby position (left side in FIG. 10). Now, a predetermined space SP is formed between the bottom surface of the lens barrel 4 and the subject side (closer to the image sensor 7) of the image sensor support frame 8 in the lens barrel container 5.

Then, upon the tuning-on of the blur correction switch, the rotation transfer gear 27 engaging with output gear 26 is rotated clockwise by the counterclockwise rotation of the drive motor 20, thereby controlling the edge of the cam follower 31 to get in contact with a top 33T (FIG. 9B) of the cam plane 33. Here, the rotation transfer gear 27 (gear portion 28) and the operation shaft 29 are moved towards the shaft support plate 32 against the biasing force of the bias spring 30 so that the end of the operation shaft 29 presses the upper surface of the other end of the retention lever 22.

Accordingly, the one end of the retention lever is moved towards the lens barrel 4 (left side in FIG. 10) with the moving shaft 36 (FIG. 3) as a supporting point against the biasing force of the blade spring member 24, allowing the protrusion 23 to be released from the engagement with the recess on the image sensor support frame 8. This makes it possible to release the mechanical retention of the image sensor support frame 8 and make the blur correction unit 9 operable.

In a case where the digital camera 1 is powered on but the blur correction switch is turned off, the protrusion 23 is engaged with the recess 19 on the image sensor support frame 8 (FIG. 2) to mechanically retain the image sensor support frame 8.

As described above, according to the digital camera 1 (imaging apparatus) of the present embodiment, it is able to eliminate the necessity of the space to move the retention lever 22 to the opposite side to the subject beyond the image sensor 7 since with the ejection of the lens barrel 4 to the subject side, the predetermined space SP is formed between the lens barrel 4 and the image sensor support frame 8 to move the one end of the retention lever 22 substantially in the optical axis direction by the operation of the reciprocation mechanism 21. This accordingly makes it possible to reduce the thickness of the lens barrel 4 in the optical axis direction.

Moreover, according to the present embodiment, with such a configuration in which the one end of the retention lever 22 is moved substantially in the optical axis direction by the operation of the reciprocation mechanism 21 at formation of the predetermined space SP, the movable retention lever 22 can be mounted even in small or thin-model digital cameras with higher component mounting density without interfering with surrounding components or wirings.

Further, the digital camera 1 according to the present embodiment is configured that the image sensor support frame 8 is mechanically retained by the engagement of the protrusion 23 at the end of the retention lever 22 and the recess 19 on the image sensor support frame 8 while the digital camera 1 is powered on but the blur correction switch is turned off. That is, the image sensor support frame 8 can be retained at the predetermined position without energization of the coils 16*a*, 16*b* of the blur correction unit 9, in other words, without extraneous power consumption.

Figure 11:
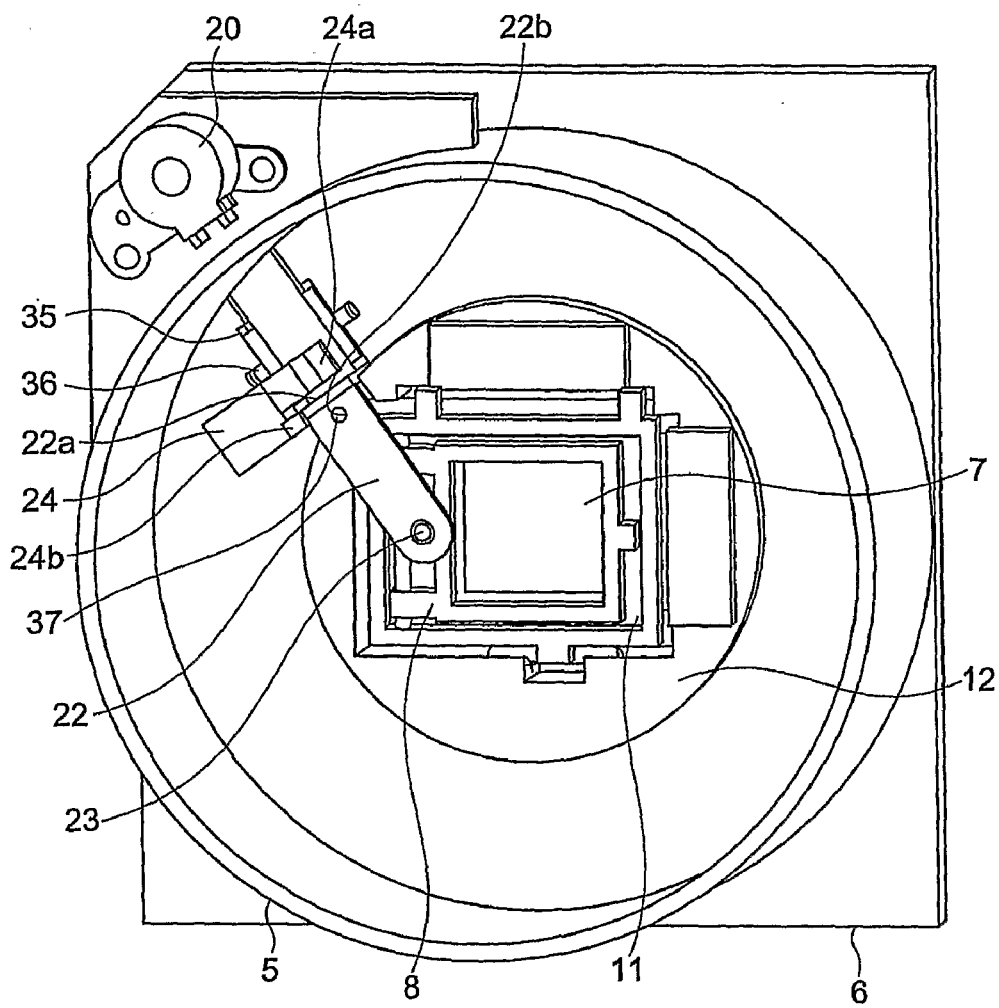
FIG. 11 is a schematic perspective view of a front side of the base plate with a blade spring member in the digital camera according to the first embodiment of the present invention.
Figure 12:
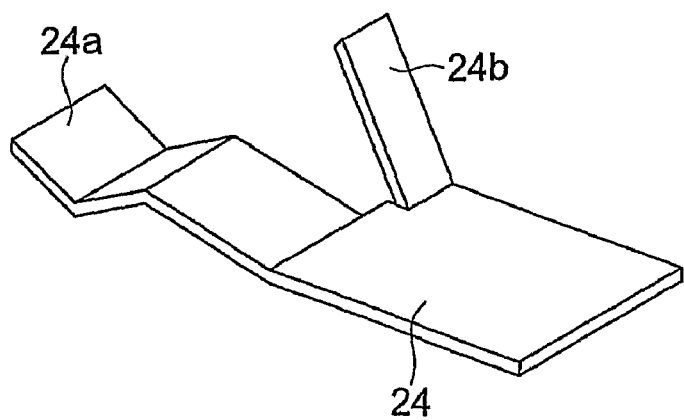
FIG. 12 is a perspective view of the blade spring member in the digital camera according to the first embodiment of the present invention.

Note that the end of the retention lever 22 is biased only towards the base plate 6 by the blade spring member 24 in the present embodiment. However, as shown in FIGS. 11, 12, the blade spring member 24 can be configured of a first blade spring portion 24*a* and a second blade spring portion 24*b*.

The first blade spring portion 24*a* is configured to abut with the upper surface of the retention lever 22 at a position a little closer to the end thereof than the moving shaft 36 to bias the end towards the base plate 6. The second blade spring portion 24*b* abuts with the side surface of the step 22*a* of the retention lever 22 to bias the retention lever 22 in a vertical direction relative to the optical axis. This results in biasing the guide pin 37 to one side of the guide hole 22*b* (opposite side of the second blade spring portion 24*b*). Accordingly, even with a gap of over a predetermined length between the guide hole 22*b* and guide pin 37, it is made possible to prevent shakiness of the retention lever 22 in the vertical direction relative to the optical axis.

Second Embodiment

Figure 13:
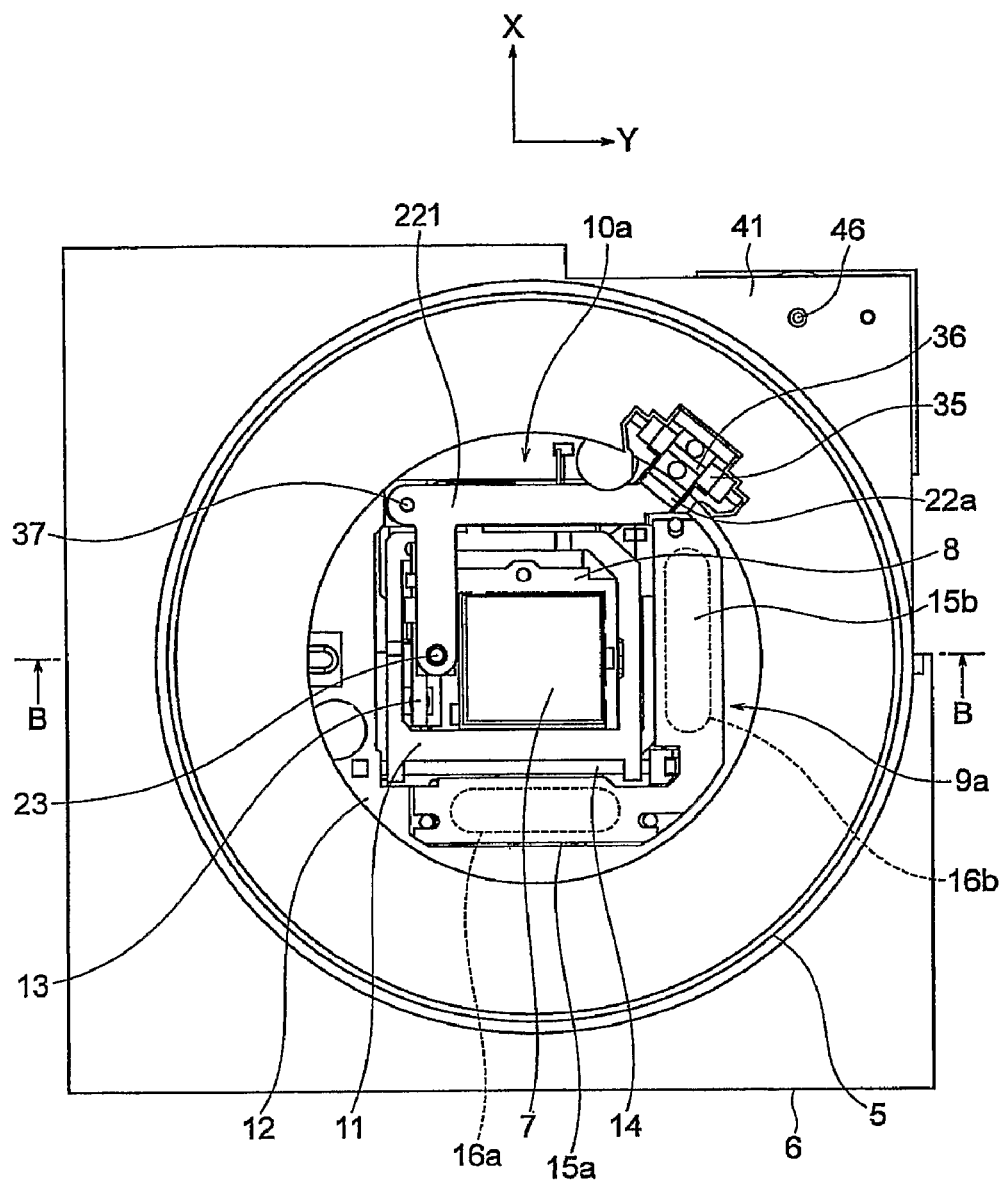
FIG. 13 is a front view of the base plate of the digital camera according to a second embodiment of the present invention.
Figure 14:
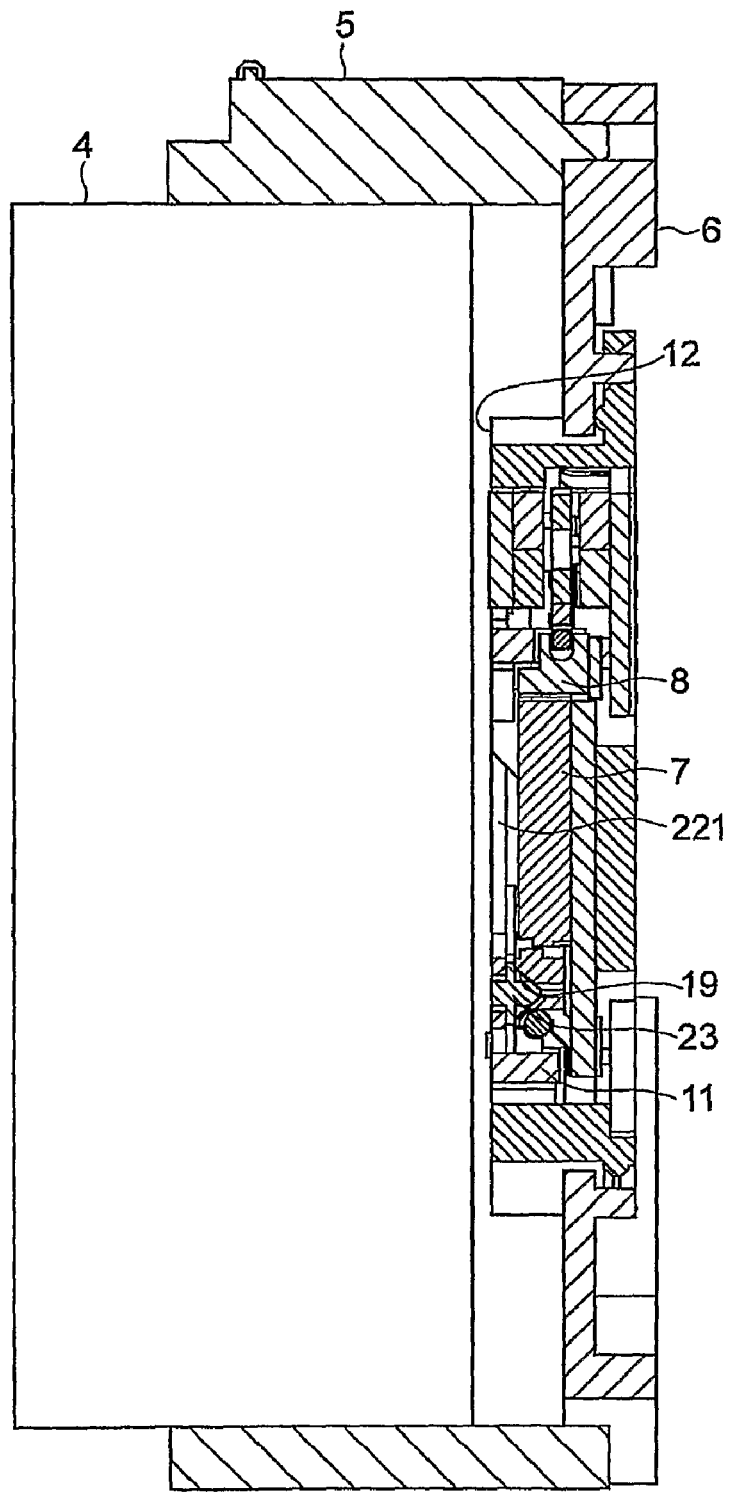
FIG. 14 is a cross sectional side view of the lens barrel at a retracted position in a tubular lens barrel container of the digital camera according to the second embodiment of the present invention.

FIG. 13 is a front view of the lens barrel container on the base plate in the digital camera according to the second embodiment of the present invention. FIG. 14 is a cross sectional view thereof along the B to B line in FIG. 13. Note that the components having the same functions as those in the first embodiment will be given the same numeric codes (with a few exceptions).

Similarly to the first embodiment, the base plate 6 is positioned in the center of the lens barrel container 5. On the surface of the base plate 6 mounted are an image sensor support frame 8 supporting an image sensor 7 as CCD or the like, a blur correction unit 9*a* moving the image sensor support frame 8 in the plane perpendicular to the optical axis direction for blur correction, and a retainer unit 10*a* mechanically retaining the image sensor support frame 8 to restrict the movement thereof.

(Configuration of Blur Correction Unit 9*a*)

The blur correction unit 9*a* comprises a slide frame 11 which movably holds the image sensor support frame 8 and is movably supported in a slide frame support frame 12 on the base plate 6 of the lens barrel container 5. One side of the image sensor support frame 8 is inserted through a guide bar 13 provided in the slide frame 11 to be movably supported in X-axis direction (vertical direction in FIG. 13). The opposite side of the image sensor support frame 8 is also movably supported by another guide bar (not shown). The image sensor support frame 8 and the slide frame 11 are equivalent to the frame member.

The slide frame 11 is inserted through a guide bar 14 provided in the slide frame support frame 12 to be movably supported in Y-axis direction (horizontal direction in FIG. 13). The opposite side of the slide frame 11 is also movably supported by another guide bar (not shown).

Magnets 15*a*, 15*b* integrally molded with yokes are disposed on the slide frame support frame 12 so as to be adjacent to the slide frame 11 in the Y-axis and X-axis directions, respectively. Coils 16*a*, 16*b* are disposed on the back side of the magnets 15*a*, 15*b*, facing thereto. The coil 16*a* is fixed at a not-shown protrusion on the slide frame 11 while the coil 16*b* is fixed at a not-shown protrusion on the image sensor support frame 8.

A flow of electric current to the coil 16*a*, 16*b* generates respective magnetic fields and attraction/repulsion between the coil 16*a* and the magnet 15*a* and between the coil 16*b* and the magnet 15b. By controlling the flow of electric current, the image sensor support frame 8 and the slide frame 11 can be moved in the X-axis and Y-axis directions, respectively. Note that the image sensor support frame 8 and the slide frame 11 are provided with a not-shown position detection element as a hall element to detect positions thereof.

The blur correction unit 9a controls the electric current applied to the coils 16a, 16b based on blur detection information which is obtained by a not-shown gyrosensor or the like in the camera body 2, thereby generating the attraction/repulsion from the magnetic fields between the coil 16a and the magnet 15a and between the coil 16b and the magnet 15b. The blur correction unit 9a performs the blur correction by using attraction/repulsion due to the magnetic field to negate the blur, that is, to move the image sensor support frame 8 in the X-axis direction and the slide frame 11 in the Y-axis direction.

Further, as shown in FIG. 14, a recess 19 with a square opening end and a square bottom is formed on the front surface of the image sensor support frame 8 (front surface of the image sensor 7), to be detachably engaged with a protrusion 23 provided at the edge of a later-described retention lever 221. The recess 19 as shown in FIG. 6 has such an inclined surface to be widened from the bottom towards the opening end on the subject side.

Regarding the shape of the recess 19, it can be configured with a round bottom and a round opening end to form such an inclined inner wall to be widened from the bottom to the opening end, as shown in FIG. 7 for example.

(Configuration of Retainer Unit 10a)

Figure 15:
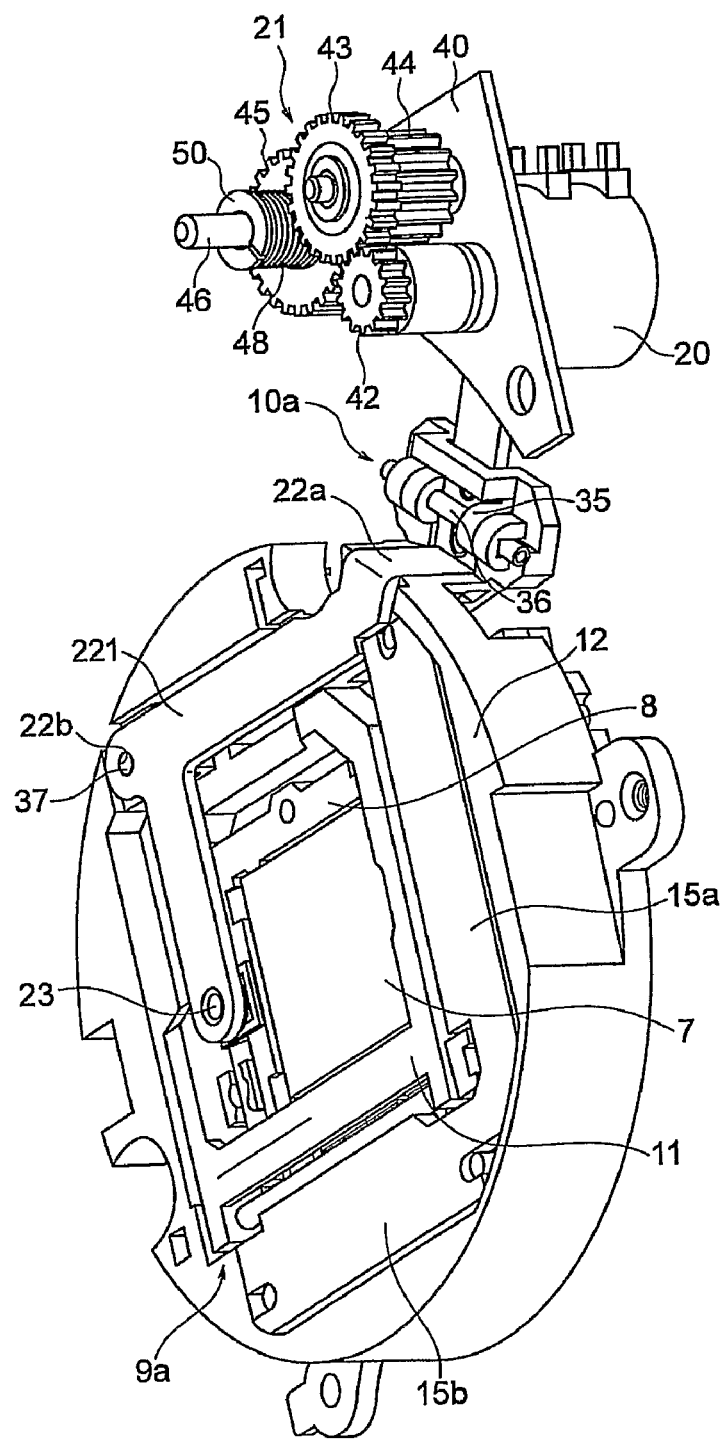
FIG. 15 is a perspective view of a retainer unit of the digital camera according to the second embodiment of the present invention.

In FIG. 15, the retainer unit 10a comprises a drive motor 20, a reciprocation mechanism 21 converting rotary movement of the drive motor 20 to a linear reciprocative movement, and a retention lever of a thin plate 221 moving along with reciprocative movements of the reciprocation mechanism 21 and having a protrusion 23 at one end to be detachably engaged with the recess 19.

Figure 16:
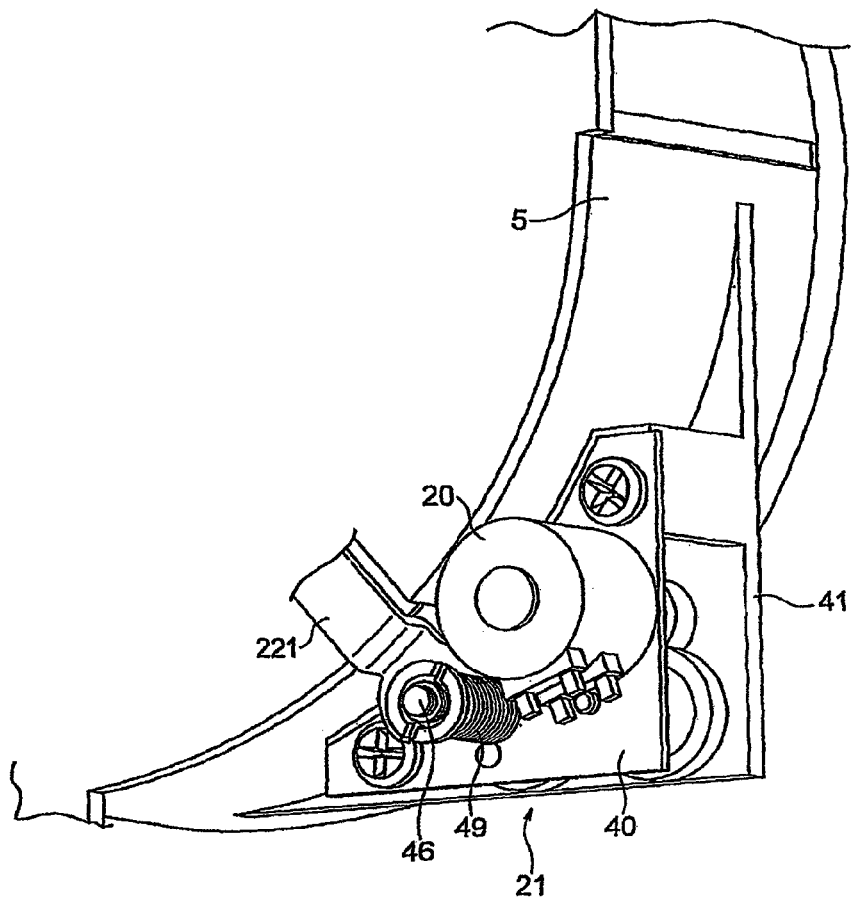
FIG. 16 is a perspective view of a reciprocation mechanism of the digital camera according to the second embodiment of the present invention.
Figure 17:
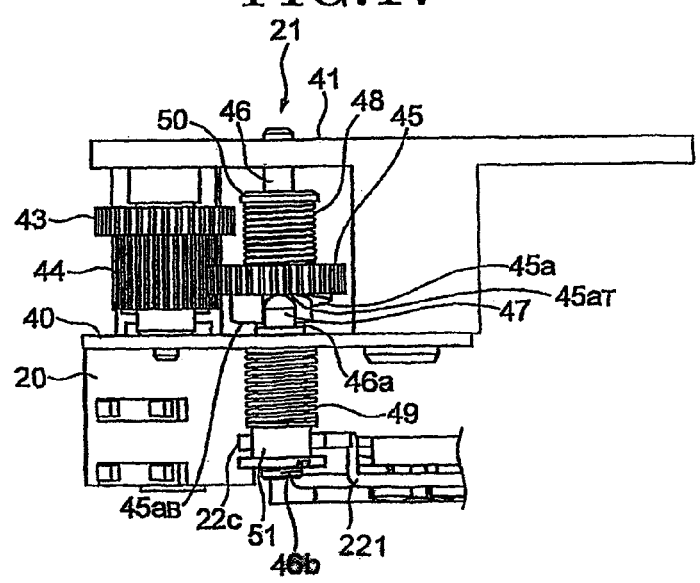
FIG. 17 is a side view of the reciprocation mechanism of the digital camera according to the second embodiment of the present invention.

The drive motor 20 such as a stepping motor is supported by a support plate 40 fixed to a flange 41 which is integrally formed with the outer surface of the lens barrel container 5 (FIGS. 16 and 17). A not-shown output gear is fixed to a motor shaft (output shaft) of the drive motor 20 and is coupled with the reciprocation mechanism 21.

The reciprocation mechanism 21, as shown in FIGS. 15, 17, comprises a rotation transfer gear 43 engaged with an output gear 42 fixed to the motor axis (output axis) of the drive motor 20, a transfer gear 44 integrated coaxially with the rotation transfer gear 43, a cam gear 45 having a cam plane 45a and engaging with the transfer gear 44, an operation shaft 46 inserting through a shaft hole of the cam gear 45, a cam follower 47 abutting with the cam plane 45a, a first coil spring 48 on a circumference of one end (upper end in FIG. 17) of the operation shaft 46, and a second coil spring 49 a circumference of the other end (lower end in FIG. 17) of the operation shaft 46. The operation shaft 46 is disposed in the optical axis direction (vertical direction in FIG. 17), and movably supported at one end (upper end in FIG. 17) in the optical axis direction by the flange 41 and at around the middle portion in the optical axis direction by the motor support plate 40 to which the cam follower 47 is fixed.

The movement of the cam gear 45 is restricted in the optical axis direction by a gear bearing 46a mounted on a motor support plate 40 side of the operation shaft 46. Also, the cam gear 45 is biased towards the motor support plate 40 by the first coil spring 48 whose one end is fixed by a trigger member 50 attached to the operation shaft 46. As above, the cam follower 47 constantly abuts with the cam plane 45a of the cam gear 45.

A screw groove 46b is formed on the circumference of the other end (lower end in FIG. 17) of the operation shaft 46, to threadably engage a screw provided on a lever bearing 51. The lever bearing 51 is biased towards the other end (lower end in FIG. 17) of the operation shaft 46 by the second coil spring 49 whose one end is fixed by the motor support plate 40. Note that the bias force of the first coil spring 48 is set to be larger than that of the second coil spring 49.

As shown in FIGS. 13, 15, one end of the retention lever 221 extends along the surface of the slide frame support frame 12, and is bent at a right angle at the corner of the slide frame 11 and extends to about a recess 19 (FIG. 14) on the image sensor support frame 8. A protrusion 23 is attached to the edge of the retention lever 221 to be detachably engaged with the recess 19. On the other side thereof, a connecting portion 22c with a circular opening is provided to fit with the lever bearing 51 screwed with the operation shaft 46 (FIG. 17).

In FIG. 15, the retention lever 221 is movably supported at around the middle portion (near a step 22a on the other end thereof positioned on the side of the slide frame support frame 12) by the moving shaft 36 supported by a bearing member 35. Also, a guide hole 22b is formed on the right-angled corner of the retention lever 221 and detachably fitted with a guide pin 37 on the slide frame support frame 12.

Next, operation of the retainer unit 10a to retain the support frame 8 to restrict the movement thereof will be described.

As shown in FIG. 14, the lens barrel 4 is positioned at the retreated position in the lens barrel container 5 while a not-shown power switch of the digital camera 1 (FIG. 1) is powered off (not-shown blur correction switch to actuate the blur correction unit 9a is also turned off). In this state, the rotation transfer gear 43 and transfer gear 44 engaged with the output gear 42 are rotated counterclockwise by the clockwise rotation of the drive motor 20 to rotate the cam gear 45 clockwise, thereby controlling the edge of the cam follower 47 to get in contact with a bottom 45aB of the cam plane 45a (FIG. 17).

Here, the cam gear 45 is moved towards the flange 41. Along with this movement, the bias force of the first coil spring 49 causes the operation shaft 46 to move towards the flange 41. This makes the lever bearing 51 screwed with the edge of the operation shaft 46 move towards the motor support plate 40.

Accordingly, as shown in FIG. 14, the edge of the retention lever 221 is moved towards the base plate 6 (right side in FIG. 14), thereby engaging the protrusion 23 with the recess 19 on the image sensor support frame 8. As a result, the image sensor support frame 8 is mechanically retained such that the center of the image sensor 7 is positioned on the optical axis, to restrict the movement of the image sensor support frame 8 or image sensor 7.

Figure 18:
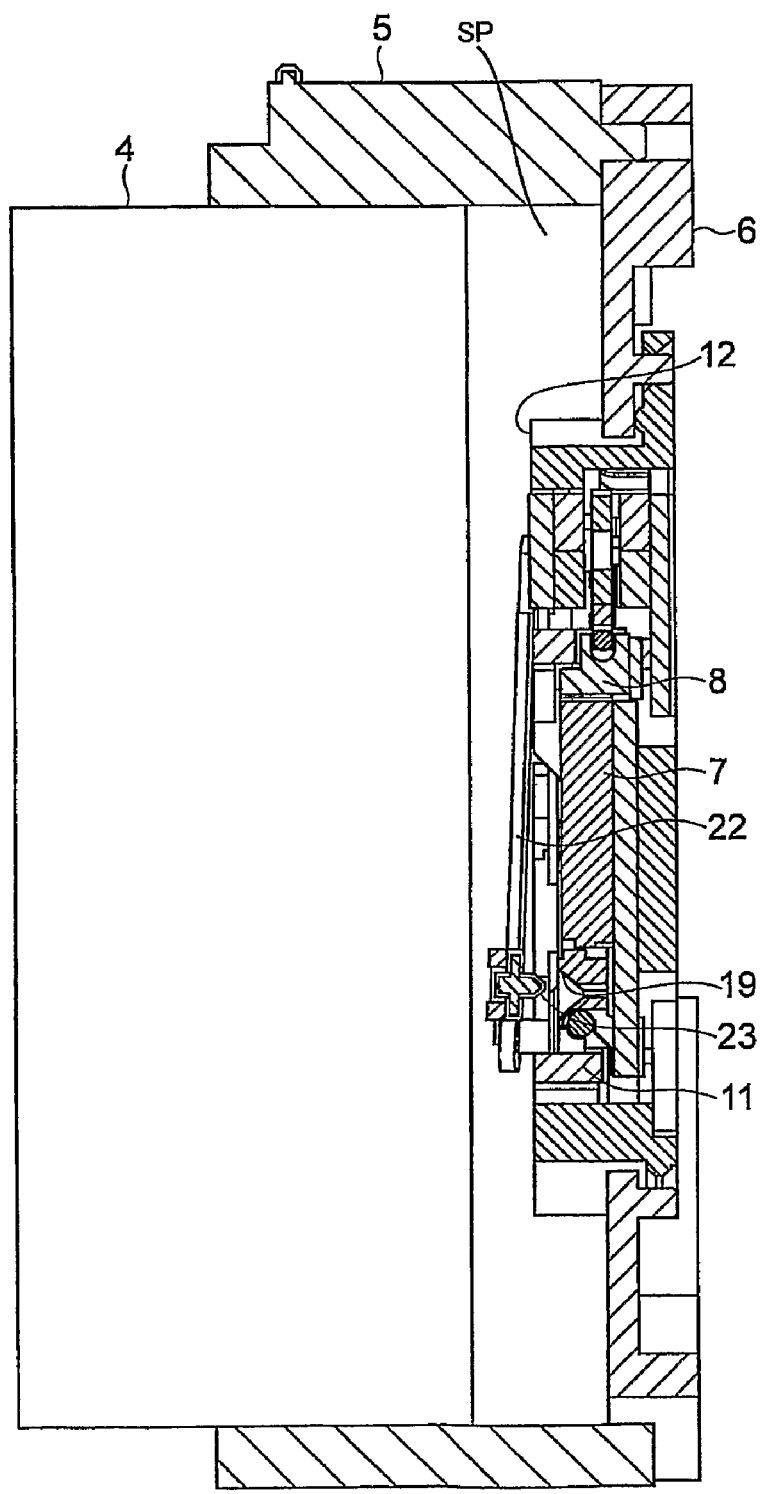
FIG. 18 is a cross sectional side view of the lens barrel ejected from the lens barrel container of the digital camera according to the second embodiment of the present invention.

Meanwhile, as shown in FIG. 18, at turning on the power switch of the digital camera 1, a drive mechanism moves the lens barrel 4 forward from the retreated position (in FIG. 14) in the lens barrel container 5 to the standby position (left side in FIG. 18). Now, a predetermined space SP is formed between the bottom surface of the lens barrel 4 and the subject side (closer to the image sensor 7) of the image sensor support frame 8 in the lens barrel container 5.

Then, at the tuning-on of the blur correction switch, the rotation transfer gear 43 and transfer gear 44 engaged with the output gear 42 are rotated clockwise by the counterclockwise rotation of the drive motor 20 to rotate the cam gear 45 counterclockwise, thereby controlling the edge of the cam follower 47 to get in contact with a top 45aT (FIG. 17) of the cam plane 45a. Here, the cam gear 45 is moved towards the motor support plate 40, and the operation shaft 46 is moved towards the motor support plate 40 by the bias force of the first coil spring 48. This makes the lever bearing 51 screwed with the one end of the operation shaft 46 move to an opposite side to the motor support plate 40.

Accordingly, the edge of the retention lever 221 is moved towards the lens barrel 4 (left side in FIG. 18) with the moving shaft 36 (FIG. 15) as a supporting point, allowing the protrusion 23 to be released from the engagement with the recess on the image sensor support frame 8. This releases the mechanical retention of the image sensor support frame 8 and makes the blur correction unit 9a operable.

In a case where the digital camera 1 is powered on but the blur correction switch is turned off, the protrusion 23 is engaged with the recess 19 on the image sensor support frame 8 to mechanically retain the image sensor support frame 8, as in FIG. 14.

As described above, according to the digital camera 1 (imaging apparatus) of the present embodiment, it is able to eliminate the necessity of the space to move the retention lever 221 to the opposite side to the subject beyond the image sensor 7 since with the ejection of the lens barrel 4 to the subject side, the predetermined space SP is formed between the lens barrel 4 and the image sensor support frame 8 to move the one end of the retention lever 221 in the space SP substantially in the optical axis direction by the operation of the reciprocation mechanism 21. This accordingly makes it possible to reduce the thickness of the lens barrel 4 in the optical axis direction.

Moreover, according to the present embodiment, with such a configuration in which the one end of the retention lever 221 is moved by the operation of the reciprocation mechanism substantially in the optical axis direction in the predetermined space SP at formation of the space SP, the movable retention lever 221 can be mounted even in small or thin-model digital cameras with higher component mounting density without interfering with surrounding components or wirings.

Further, the digital camera 1 according to the present embodiment is configured that the image sensor support frame 8 is mechanically retained by the engagement of the protrusion 23 and the recess 19 while the digital camera 1 is powered on but the blur correction switch is turned off. That is, the image sensor support frame 8 can be retained at the predetermined position without energization of the coils 16a, 16b of the blur correction unit 9a, in other words, without extraneous power consumption.

Still further, in the present embodiment, the lever bearing 51 is configured to be engaged with the operation shaft 46. This makes it possible to precisely move the retention lever 221 even when the mounting portion of the retention lever is deviated due to an assembly error or the like, by adjusting the engagement of the lever bearing 51 and operation shaft 46 to correct the deviation.

Third Embodiment

Figure 19:
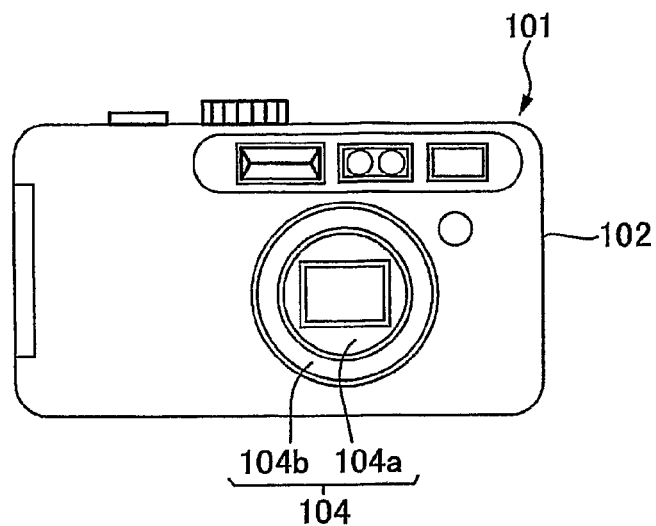
FIG. 19 is a front view of the digital camera as an example of the imaging apparatus according to the second embodiment of the present invention.
Figure 20:
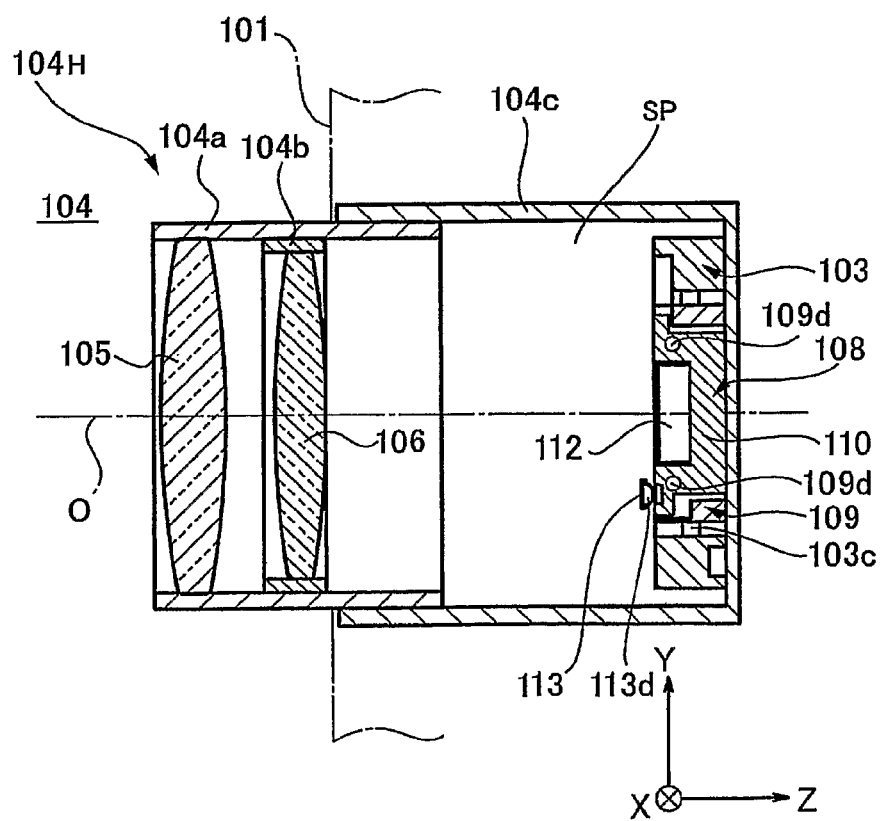
FIG. 20 is a cross sectional side view of the lens barrel at a retreated position in the lens barrel container of the digital camera according to the second embodiment of the present invention.

FIG. 19 is a front view of a digital camera 101 according to the third embodiment, and it shows a camera body 102 and a lens barrel 104. The lens barrel 104 in FIG. 20 is substantially composed of a base member 103 and a tubular body 104H which is composed of first to third tubes 104a, 104b, 104c, for example. In the present embodiment, the third tube 104c is fixed to the camera body 102. The lens barrel 104 contains a shutter unit, an aperture diaphragm unit (not shown) and so on.

The first and second tubes 104a, 104b are movable along the optical axis of the optical photographic system between a predetermined retreated position and a predetermined standby position. The moving (ejection) mechanism of the lens barrel 104 is feasible by a known technique using a helicoid groove. The first tube 104a contains a photographic lens 105 for example, and the second tube 104b contains a movable imaging lens 106. The photographic lens 105 and imaging lens 106 are ejected forward from the camera body 102 at shooting and contained therein during non-shooting.

The base member 103 is fixed to the camera body 102 via the third tube 104c and made of a rectangular frame body which is composed of a first pair of parallel frames 103a and a second pair of parallel frames 103b extending in a direction orthogonal to the first pair of parallel frames as shown in FIG. 21.

Figure 21A:
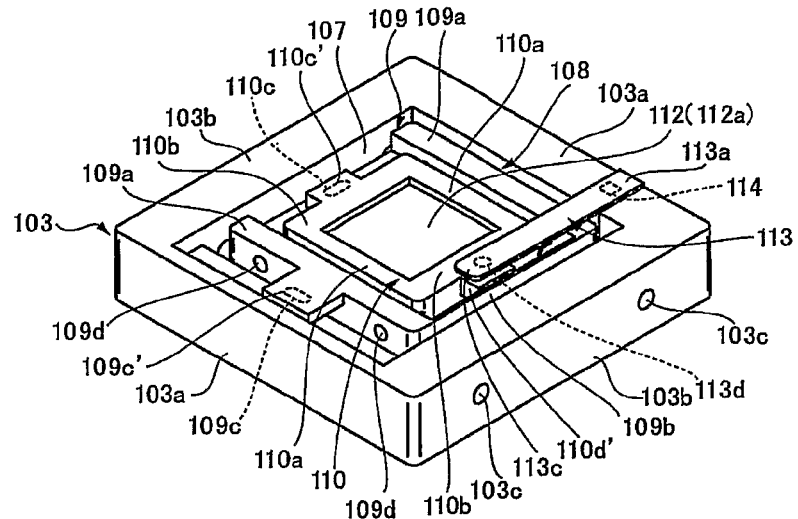
FIG. 21A is a perspective view of the periphery of the image sensor retained by a retention lever according to the second embodiment of the present invention.
Figure 21B:
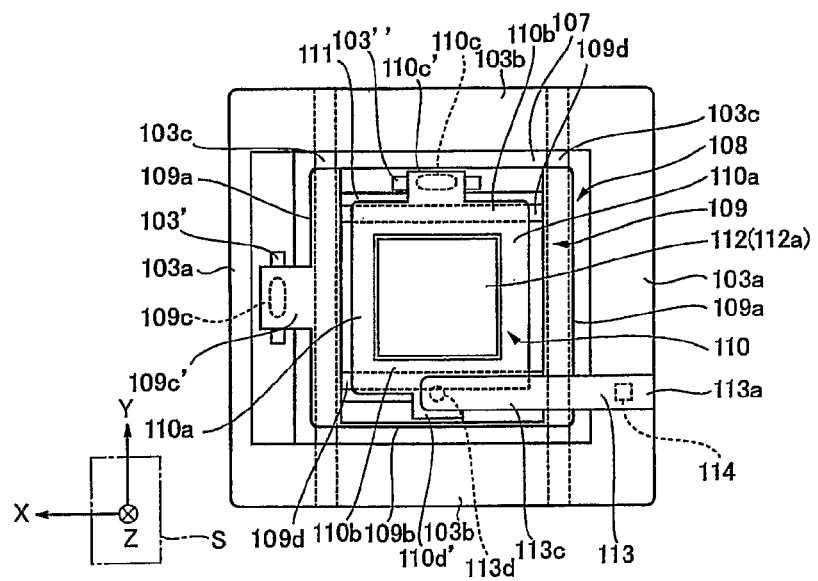
FIG. 21B is a plain view thereof seen from an imaging plane side.
Figure 21C:
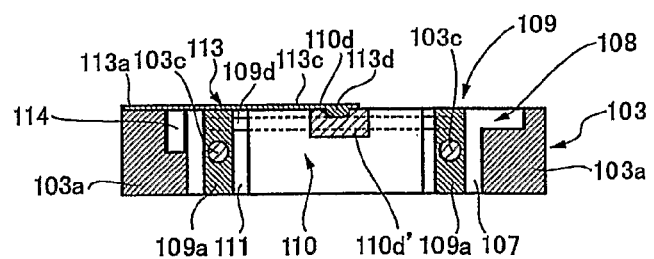
FIG. 21C is a cross sectional view of the retention lever.

The base member 103 includes a space 107 surrounded by the two pairs of parallel frames 103a, 103b in which an image sensor support stage 108 is disposed. The image sensor support stage 108 is composed of a slide frame 109 and an image sensor support frame 110 as shown in FIGS. 21A to 21C, which are equivalent to the frame member.

A pair of guide shafts 103c are formed in the second pair of parallel frames 103b and extend along the first pair of parallel frames 103a with a distance in the extension direction of the second pair of parallel frames 103b.

The slide frame 109 is composed of a pair of parallel frames 109a and a connection frame 109b extending in a direction orthogonal to the parallel frames 109a to connect them. As shown in FIG. 21C, a pair of guide shafts 103c are inserted through the pair of parallel frames 109a.

One of the parallel frames 109a has a coil portion 109c' on which a coil 109c is disposed. The coil 109c together with a permanent magnet 103' (FIG. 21B) fixed on the base member 103 function as drive means to move the slide frame 109 along the guide shafts 103c. A space 111 in which the image sensor support frame 110 is disposed is formed facing the parallel frames 109a.

A pair of guide shafts 109d are formed in the pair of parallel frames 109a, extending in a direction orthogonal to the pair of parallel frames 109a with a distance in the extension direction of the parallel frames 109a.

The image sensor support frame 110 is a rectangular frame body with a bottom, composed of a first pair of parallel frames 110a and a second pair of parallel frames 110b extending in a direction orthogonal to the first pair of parallel frames 110a to connect them. As shown in FIG. 21C, a pair of guide shafts 109d are inserted through the second pair of parallel frames 110b.

An image sensor 112 is fixed in an area of the image sensor support frame 110 surrounded by the first and second pair of parallel frames 110a, 110b. The image sensor 112 includes, on an imaging lens side, an imaging plane 112a on which a subject image is formed.

One of the parallel frames 110b has a coil portion 110c on which a coil 110c is disposed. The coil 110c' and a permanent magnet 103" (FIG. 21) fixed on the base member 103 function as drive means to move the support frame 110 along the guide shafts 109d.

Upon energization of the coil 109c, the slide frame 109 is moved in Y direction in an XY plane S orthogonal to a photographic optical axis O (Z-axis direction). Similarly, upon energization of the coil 110c, the image sensor support frame 110 is moved in X direction orthogonal to the moving direction of the slide frame 109 in the XY plane. Accordingly, the image sensor 112 is moved in a direction to offset a blur in the image due to hand shake. The principle of the blur correction is disclosed in Japanese Laid-open Patent Application Publication No. 2005-294511 and so on, therefore, a detailed description of operation, control circuits or the like will be omitted.

A flexible retention lever 113 in a perpendicular plate shape is fixed at its base end 113a to one of the parallel frames 103a in the base member 103. The retention lever 113 is disposed on an imaging plane 112a side, extending in a direction in which the parallel frames 103b extend, and it has a free end 113c on which a protrusion 113d as an engaging portion is formed.

The other of the parallel frames 110b facing the parallel frame with the coil portion 110c' has a receiving portion 110d' at a position corresponding to the coil portion 110c'. A recess 110d as receiving means is formed on the receiving portion 110d'.

On the parallel frame 103a below the base end 113a of the retention lever 113, an extendable actuator 114 made of extendable element by electric power is disposed. In this case, the extendable actuator 114 is made of piezo element. The extendable actuator 114 is directly in contact with the base end 113a at its end; however, it can be also indirectly in contact therewith.

The extendable actuator 114 extends in a parallel direction to the photographic optical axis O to abut with the base end 113a of the retention lever 113. In the present embodiment, the extendable actuator 114 as piezo element extends, being applied a voltage thereto. By the extension of the extendable actuator 114, the engagement of the protrusion 113d of the retention lever 113 and the recess 110d in the receiving portion 110d' can be released (FIGS. 22, 23).

Note that in the present embodiment, the retention lever 113, protrusion 113d, recess 110d, and actuator 114 constitute the retainer unit.

Figure 22A:
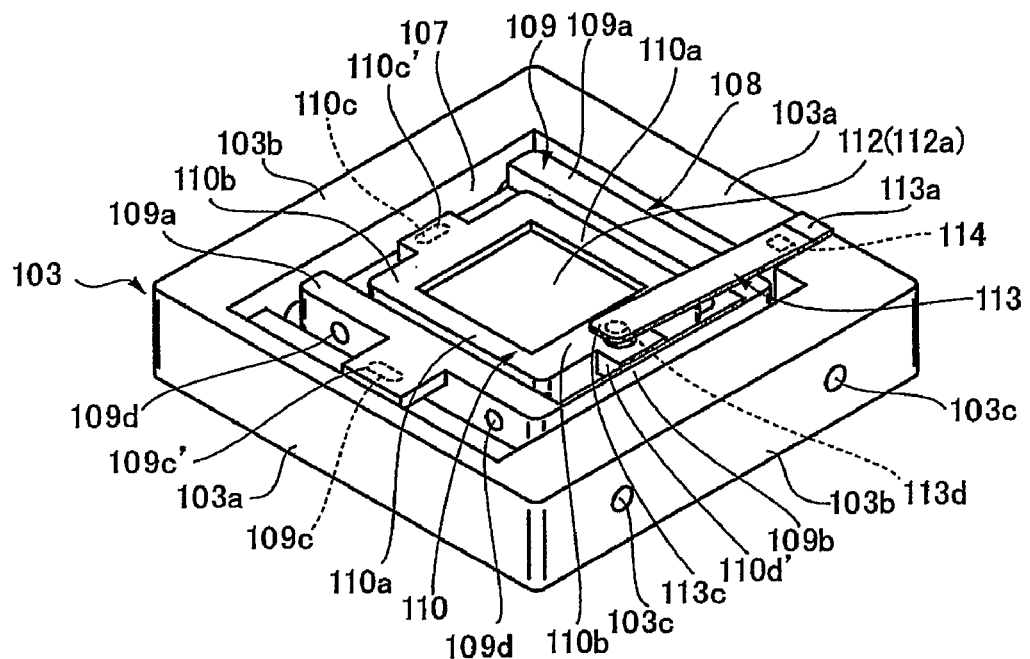
FIG. 22A is a perspective view of the periphery of the image sensor released from the retention of the retention lever according to the second embodiment of the present invention.
Figure 22B:
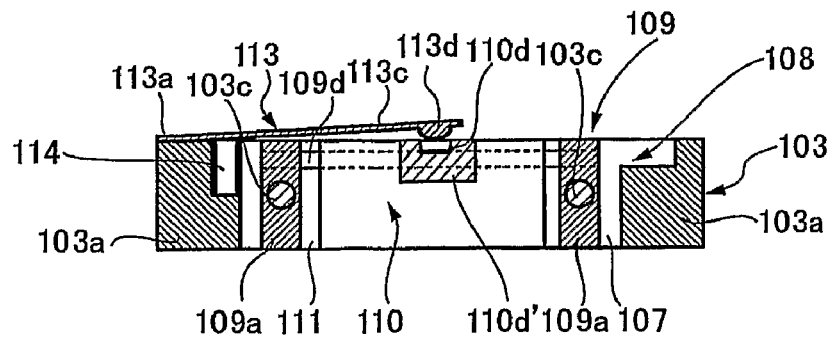
FIG. 22B is a cross sectional view of the retention lever.
Figure 23:
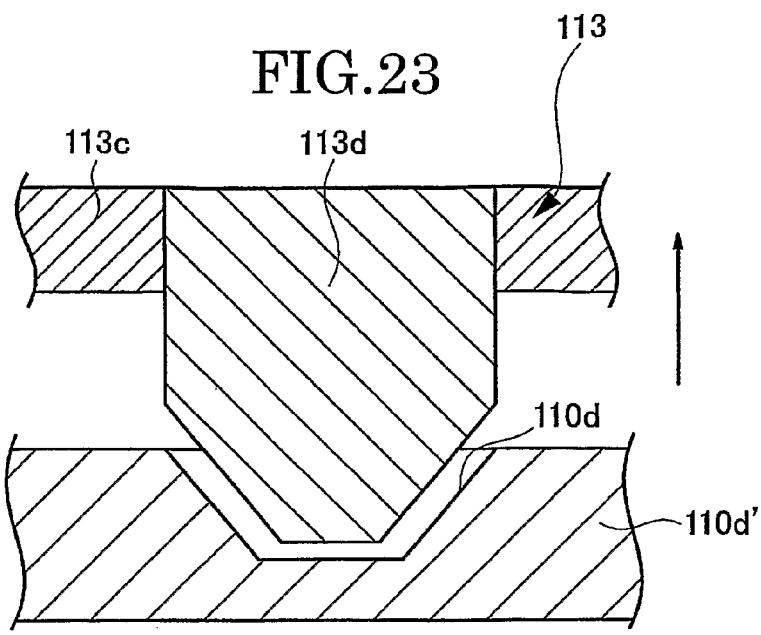
FIG. 23 is a cross sectional view of a partially enlarged protrusion and recess according to the second embodiment of the present invention.

According to the present embodiment, upon turning-on of a not-shown blur correction switch while the first and second tubes 104a, 104b are ejected, the extendable actuator 114 is applied a voltage and extends to allow the retention lever 113 to bow in such a direction as to release the engagement of the protrusion 113d and the recess 110d (FIG. 22). This enables the slide frame 109 and image sensor support frame 110 to move in the XY plane S orthogonal to the photographic optical axis O.

Meanwhile, upon turning-off of the blur correction switch, the extended actuator 114 is shortened, thereby releasing the bowing retention lever 113 to engage the protrusion 113d with the recess 110d. As a result, the image sensor 112 is retained in the base member 103 such that it is positioned at the original position at which the photographic optical axis O and the center of an image on the image sensor 112 coincide with each other.

The digital camera 101 according to the present embodiment is configured that when the predetermined space SP is formed by the ejection of the lens barrel 104 to the subject side (FIG. 20), the operation of the extendable actuator 114 moves one end of the retention lever 113 in a substantial optical axis direction of the predetermined space SP. This eliminates the necessity of a space for moving the retention lever 113 towards an opposite side to the subject side beyond the image sensor 112, and makes it possible to reduce the thickness of the lens barrel 104 in the optical axis direction.

In addition, according to the present embodiment, the image sensor support stage 108 is locked only by the extendable actuator 114 and the retention lever 113. This can simplify the structure of the drive mechanism and reduce the size thereof, compared with that in the prior art. Further, this contributes to facilitating assembly adjustment and further reducing the thickness of the digital camera in the photographic optical axis direction.

Figure 24:
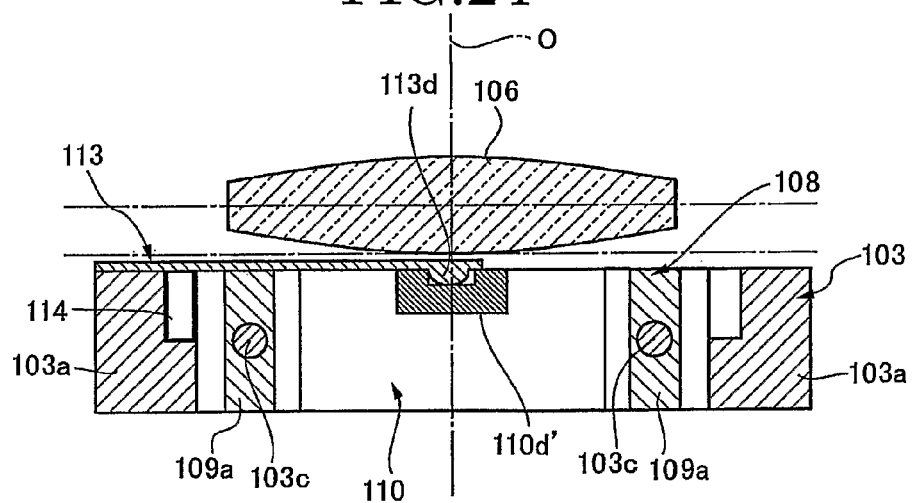
FIG. 24 shows a positional relationship between an imaging lens and the retention lever according to the second embodiment of the present invention.

Further, according to the present embodiment, even when the imaging lens 106 is contained adjacent to the imaging plane 112a of the image sensor 112 as shown in FIG. 24, as the imaging lens 106 moves to the contained position, the retention lever 113 bows in a direction to retain the image sensor support stage 108, that is, the same direction of the movement of the imaging lens 106. Therefore, even when the lens barrel 104 happens to be retreated for some reason, the imaging lens 106 and the retention lever 113 can be prevented from getting in contact with each other, thereby preventing the imaging lens 106 from being damaged. In other words, even in a case where the imaging lens 106 is set to be contained closely to the image sensor 112 for the purpose of thinning the camera body 102, the imaging lens 106 will be prevented from being damaged.

Figure 25:
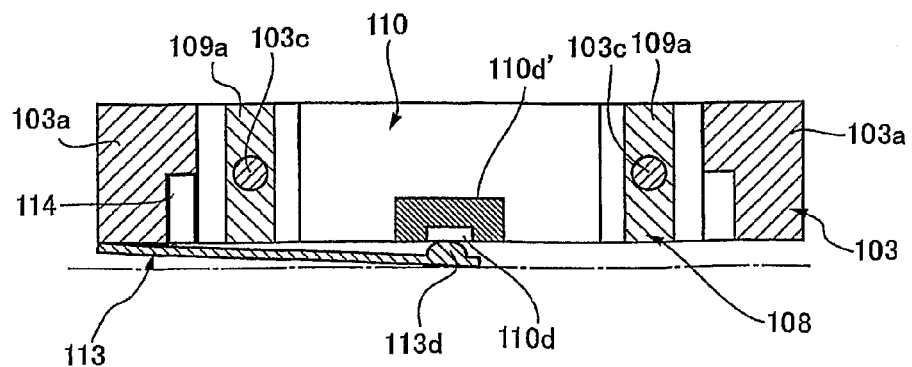
FIG. 25 is a cross sectional view of the retention lever according to a modification of the second embodiment of the present invention.

According to the present embodiment, the retention lever 113 is provided on the subject side of the base member 103 while the recess 110d is provided on the subject side of the image sensor support frame 110. However, the present invention is not limited thereto. As shown in FIG. 25, it can be configured that the retention lever 113 is provided on the opposite side of the base member 103 while the recess 110d is provided on the opposite side of the image sensor support frame 110 since the retention lever 113 is moved by the extendable actuator 114 and its moving area is limited, which facilitates the structure of the driver unit of the retention lever 113 and unnecessitates a large space therefor. Further, it can also be configured that the protrusion is formed on the image sensor support frame 110 while the recess is formed on the retention lever 113.

Fourth Embodiment

FIGS. 26 to 30 show the structure of the retainer unit according to the fourth embodiment. Note that the components having the same functions as those in the third embodiment will be given the same numeric codes and a detailed description thereof will be omitted.

Figure 26:
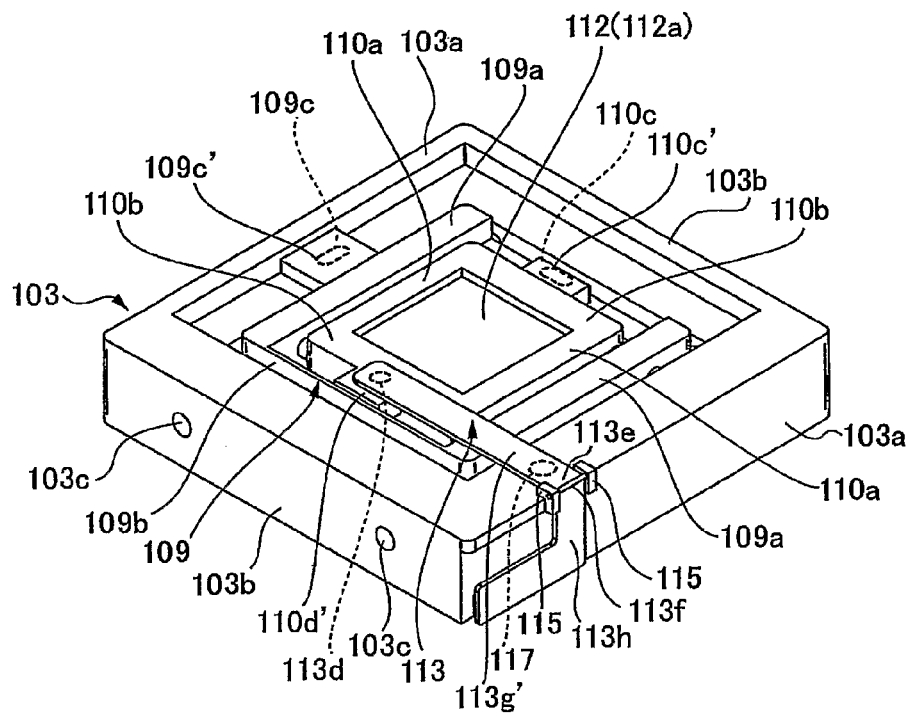
FIG. 26 is a perspective view of the periphery of the image sensor retained by the retention lever according to a third embodiment of the present invention.
Figure 27:
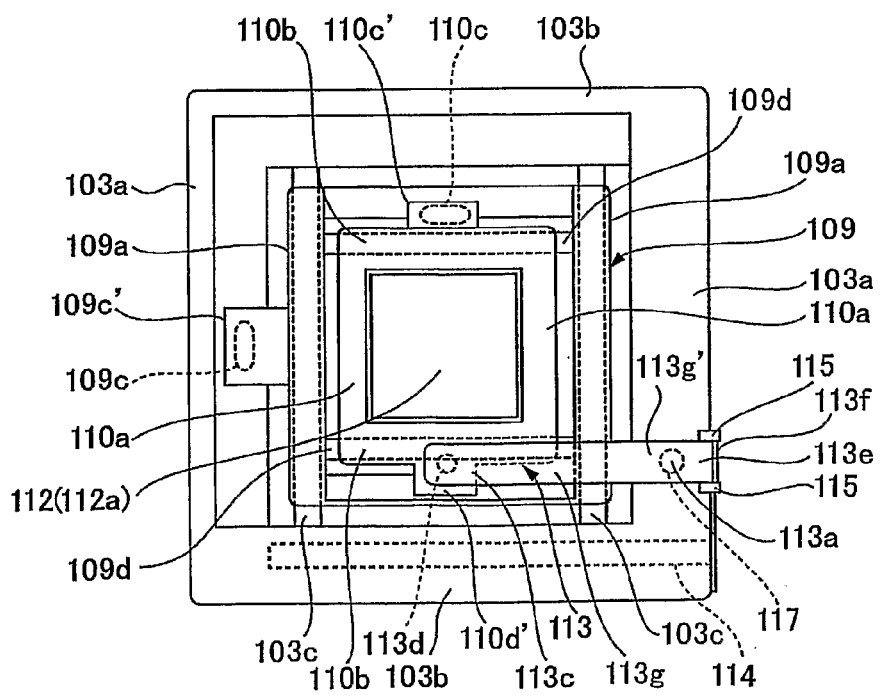
FIG. 27 is a plain view of the periphery of the image sensor according to the third embodiment of the present invention.

In the fourth embodiment, the retention lever 113 has an L-shaped form in which a long plate member is bent at a right angle, as shown in FIG. 26. On one of the parallel frame 103a in the base member 103, shaft bearings 115 are formed. A support shaft 113f is formed in a bent portion 113e of the retention lever 113 and is turnably supported by the shaft bearings 115. The retention lever 113 is movably supported in the base member 103 at the support shaft 113f as shaft center.

Seen from the support shaft 113f, a portion of the retention lever 113 is a long plate portion 113g and the other thereof is a short plate portion 113h. The protrusion 113d is formed at the end of the long plate portion 113g.

Figure 28:
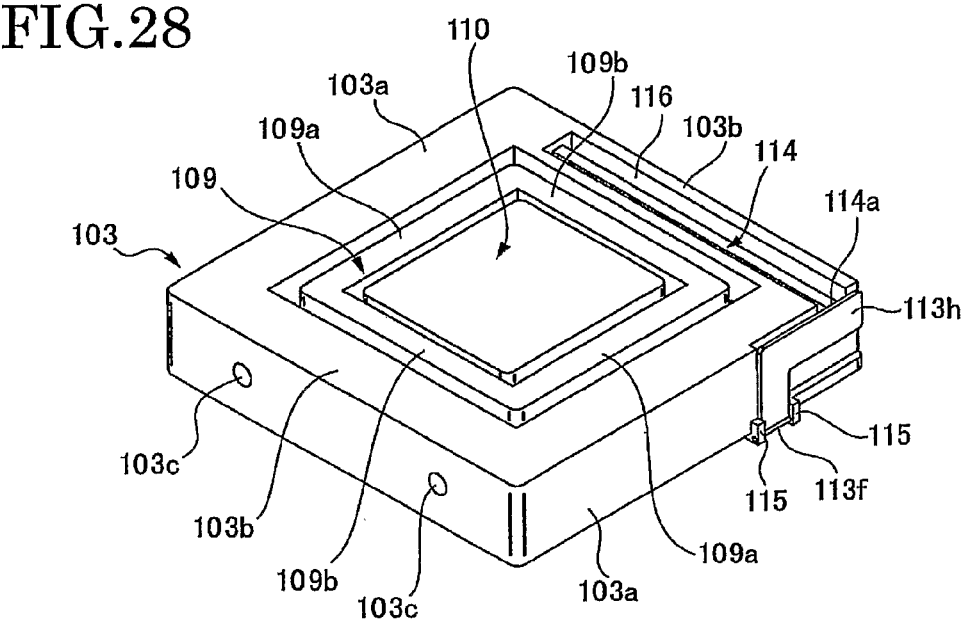
FIG. 28 is a perspective view of a back side of the periphery of the image sensor according to the third embodiment of the present invention.

A concaved portion 116 is formed on the back surface of one of the parallel frames 103b as shown in FIG. 28. The extendable actuator 114 is placed in the concaved portion 116.

The extendable actuator 114 is configured to extend in a direction in which the parallel frames 103b extend, and directly abut with the short plate portion 113h at its end surface 114a. However, it can be also configured to indirectly abut with the short plate portion 113h at its end surface 114a.

A part of the short plate portion 113h receives pressure from the end surface 114a of the extendable actuator 114. The retention lever 113 is configured that the length from the support shaft 113f to the protrusion 113d is longer than that from the support shaft 113f to the pressure receiving part.

A spring 117 is provided between the parallel frame 103a and a base portion 113g' of the long plate portion 113g, to turn the retention lever 113 in a direction to release the retention of the image sensor support frame 110.

In the present embodiment, the retention lever 113, protrusion 113d, recess 110d, support shaft 113f, actuator 114, shaft bearing 115, and spring 117 constitute the retainer unit.

Figure 29:
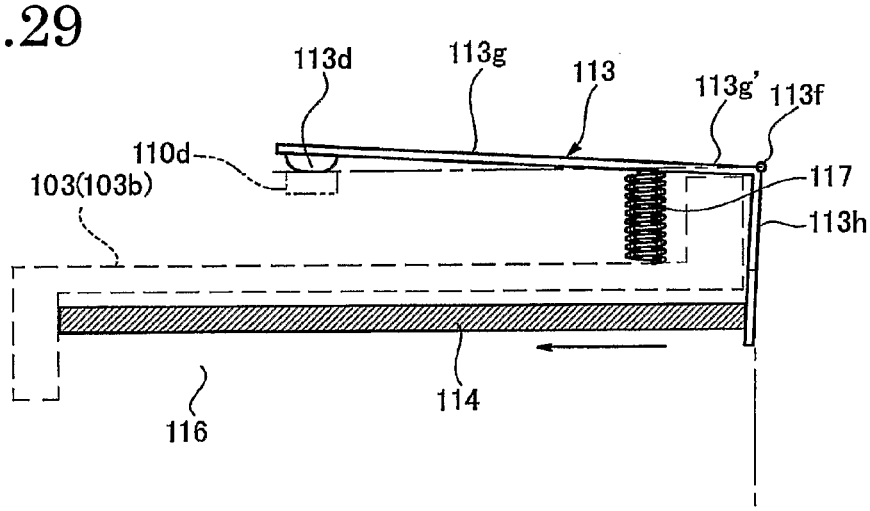
FIG. 29 is a pattern diagram of the retention lever in a retention release state according to the third embodiment of the present invention.

According to the present embodiment, upon turning-on of a not-shown blur correction switch while the first and second tubes 104a, 104b are ejected, the extendable actuator is applied a voltage and shortens to turn the retention lever 113 by the bias force of the spring 117 in such a direction as to release the engagement of the protrusion 113d and the recess 110d (FIG. 29). This enables the slide frame 109 and image sensor support frame 110 to move in the XY plane S orthogonal to the photographic optical axis O.

Meanwhile, upon turning-off of the blur correction switch, the shortened actuator 114 extends to turn the retention lever 113 around the support shaft 113f as fulcrum to move in a direction to engage the protrusion 113d on the long plate portion 113g with the recess 110d. As a result, the image sensor 112 is retained in the base member 103 such that it is positioned at the original position at which the photographic optical axis O and the center of an image on the image sensor 112 coincide with each other, for example. At this point, the spring 117 accumulates a bias force to release the engagement of the protrusion 113d and the recess 110d.

Similarly to the third embodiment, it can be configured according to the present embodiment that the retention lever 113 is provided on the opposite side of the base member 103 while the recess 110d is provided on the opposite side of the image sensor support frame 110 since the retention lever 113 is moved by the extendable actuator 114 and its moving area is limited, which facilitates the structure of the driver unit of the retention lever 113 and unnecessitates a large space therefor.

Fifth Embodiment

Figure 31:
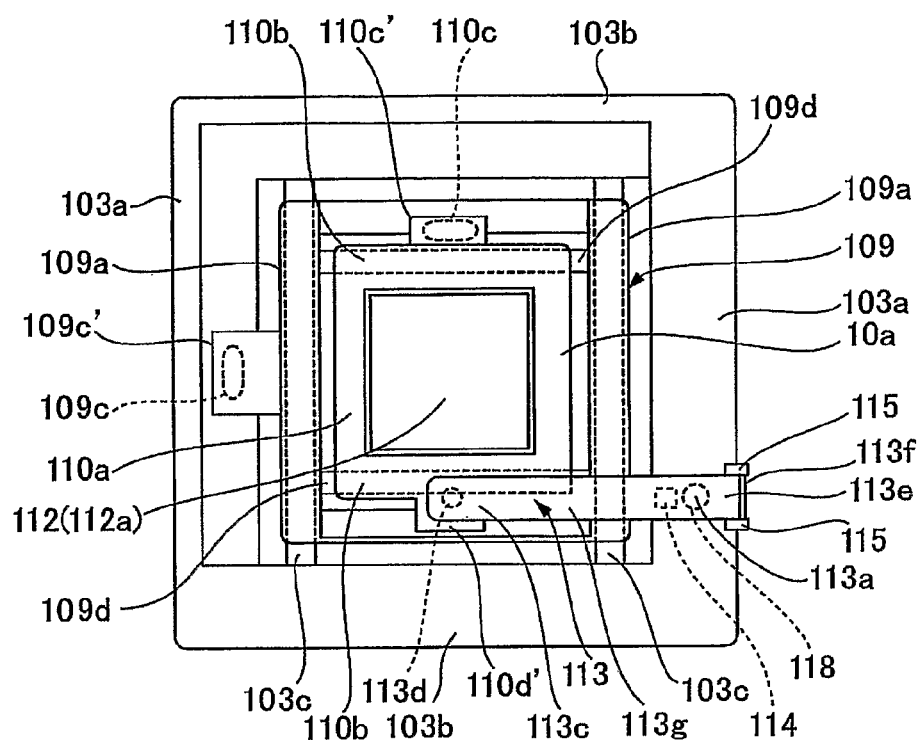
FIG. 31 is a plain view of the periphery of the image sensor according to a fourth embodiment of the present invention.
Figure 32:
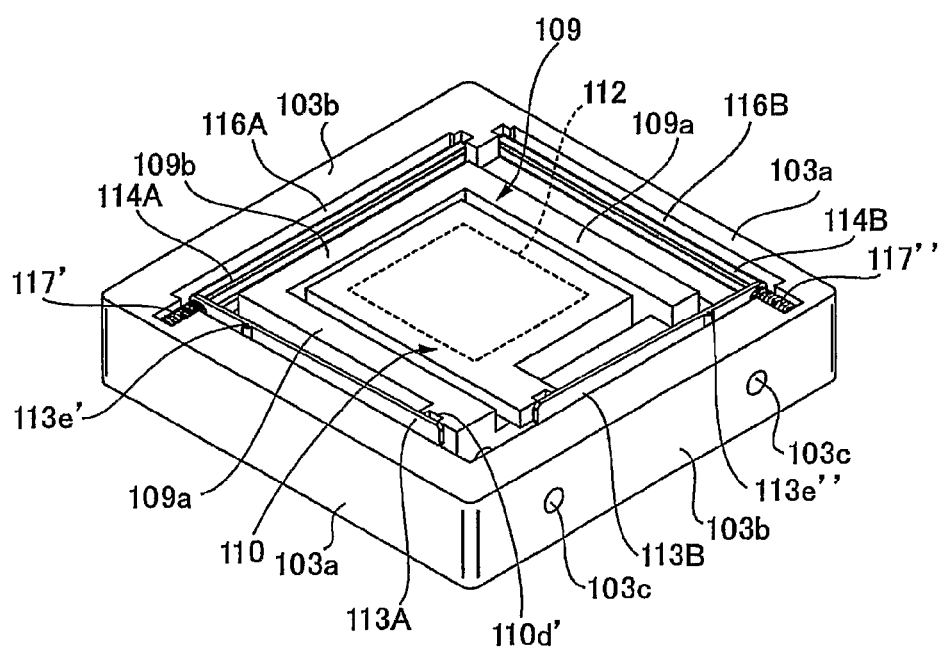
FIG. 32 is a perspective view of the periphery of the image sensor retained by the retention lever according to a fifth embodiment of the present invention.

The fifth embodiment concerns a modification of the retainer unit according to the fourth embodiment. FIG. 31 shows a structure of the retainer unit according to the present embodiment.

In FIG. 31, the retention lever 113 is a flexible perpendicular plate the same as that in FIG. 21. The support shaft 113f is formed on an edge 113e of the base end 113a of the retention lever 113 and is turnably supported by the shaft bearings 115.

The protrusion 113d is provided on the free end 113c of the retention lever 113. The extendable actuator 114 as piezo element is formed on the parallel frame 103a below the base end 113a. A part of the base end 113a receives pressure from the extended actuator 114.

Figure 30:
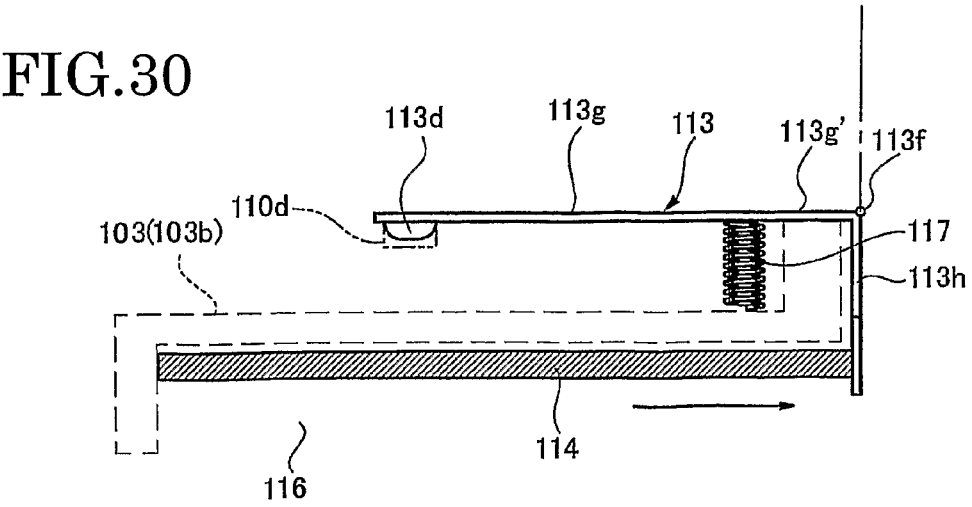
FIG. 30 is a pattern diagram of the retention lever in a retention state according to the third embodiment of the present invention.

The recess 110d is formed in the image sensor support frame 110 (not shown in FIG. 31, refer to FIG. 30). A spring 118 is provided between the parallel frame 103a and the retention lever 113, to turn the retention lever 113 in a direction to engage the protrusion 113d and the recess 110d.

In the present embodiment, the retention lever 113, protrusion 113d, recess 110d, support shaft 113f, actuator 114, shaft bearings 115, and spring 118 constitute the retainer unit.

According to the present embodiment, the extension of the actuator 114 causes the retention lever 113 to turn in a direction to release the engagement of the protrusion 113d and recess 110d. Also, the shortening of the actuator 114 causes the retention lever 113 to turn in a direction to engage the protrusion 113d and the recess 110d.

Sixth Embodiment

FIGS. 32 to 35 show the structure of the retainer unit according to the sixth embodiment. In the present embodiment, the slide frame 109 and image sensor support frame 110 are supported in the direction orthogonal to the photographic optical axis O.

The present embodiment employs a first extendable actuator 114A and a second extendable actuator 114B as piezo element, and a first retention lever 113A and a second retention lever 113B.

A concaved portion 116A extends in a direction orthogonal to the moving direction of the slide frame 109 in the back surface of one of the parallel frames 103b. The first extendable actuator 114A is placed in the concaved portion 116A so as to be orthogonal to the moving direction of the slide frame 109 and extends/shortens in a plane orthogonal to the photographic optical axis O. Further, a concaved portion 116B extends in a direction orthogonal to the moving direction of the image sensor support frame 110 on the back surface of one of the parallel frames 103a. The second extendable actuator 114B is placed in the concaved portion 116B so as to be orthogonal to the moving direction of the image sensor support frame 110 and extends/shortens in a plane orthogonal to the photographic optical axis O.

A first support shaft 113e' is provided on the base member 103 near the parallel frames 103a while a second support shaft 113e" is provided near the parallel frame 103b. The first retention lever 113A extends in parallel to the moving direction of the slide frame 109 and turnably supported by the first support shaft 113e'. The second retention lever 113B extends in parallel to the moving direction of the image sensor support frame 110 and turnably supported by the second support shaft 113e".

Seen from the first support shaft 113e', on one end of the first retention lever 113A a first protrusion 113Ad' is formed, and on the other end thereof a first pressure receiving portion 113Ad" to abut with a first piezo element 114A and receive pressure therefrom. Likewise, seen from the second support shaft 113e", on one end of the second retention lever 113B a second protrusion 113Bd' is formed, and on the other end thereof a second pressure receiving portion 113Bd" is formed to abut with a second piezo element 114B and receive pressure therefrom.

A first recess 110Ad' is formed on the side surface of the parallel frame 109a of the slide frame 109 to engage with the first protrusion 113Ad' of the first retention lever 113A while a second recess 110Bd' is formed on the side surface of the image sensor support frame 110 to engage with the second protrusion 113Bd' of the second retention lever 113B.

On the side surface of the parallel frame 103a in the base member 103, a first spring 117' is placed to bias the first retention lever 113A in a direction to release the retention of the slide frame 109. Also, a second spring 117" is placed on the parallel frame 103b in the base member 103 to bias the second retention lever 113B in a direction to release the retention of the image sensor support frame 110.

In the present embodiment, the first and second retention levers 113A, 113B, first and second protrusions 113Ad', 113Bd', first and second recesses 110Ad', 110Bd', first and second springs 117', 117", first and second support shafts 113e', 113e", and first and second actuators 114A, 114B constitute the retainer unit.

Figure 35:
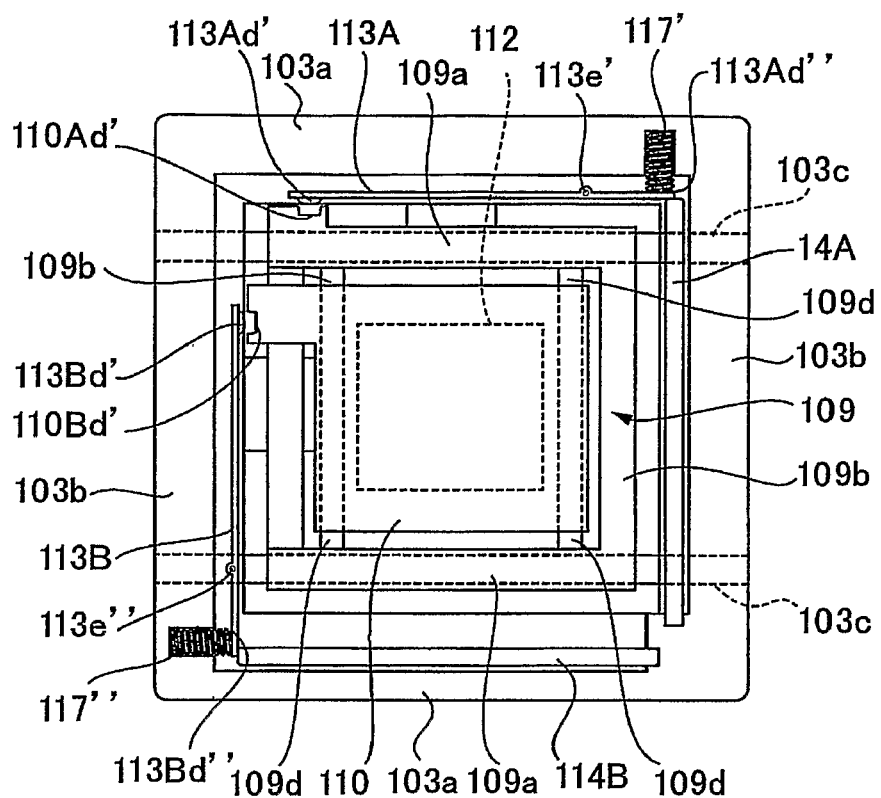
FIG. 35 is a plain view of the periphery of the image sensor released from the retention of the retention lever according to the fifth embodiment of the present invention.

According to the present embodiment, upon turning-on of a not-shown blur correction switch while the first and second tubes 104a, 104b are ejected, the first extendable actuator 114A is applied a voltage and shortens to turn the first retention lever 113A by the bias force of the spring 117' in such a direction as to release the engagement of the first protrusion 113Ad' and the first recess 110Ad' (FIG. 35). Likewise, upon turning-on of a not-shown blur correction switch while the first and second tubes 104a, 104b are ejected, the second extendable actuator 114B is applied a voltage and shortens to turn the second retention lever 113B by the bias force of the spring 117'' in such a direction as to release the engagement of the second protrusion 113Bd' and the second recess 110Bd' (FIG. 35). This enables the slide frame 109 and image sensor support frame 110 to move in the XY plane S orthogonal to the photographic optical axis O.

Figure 33:
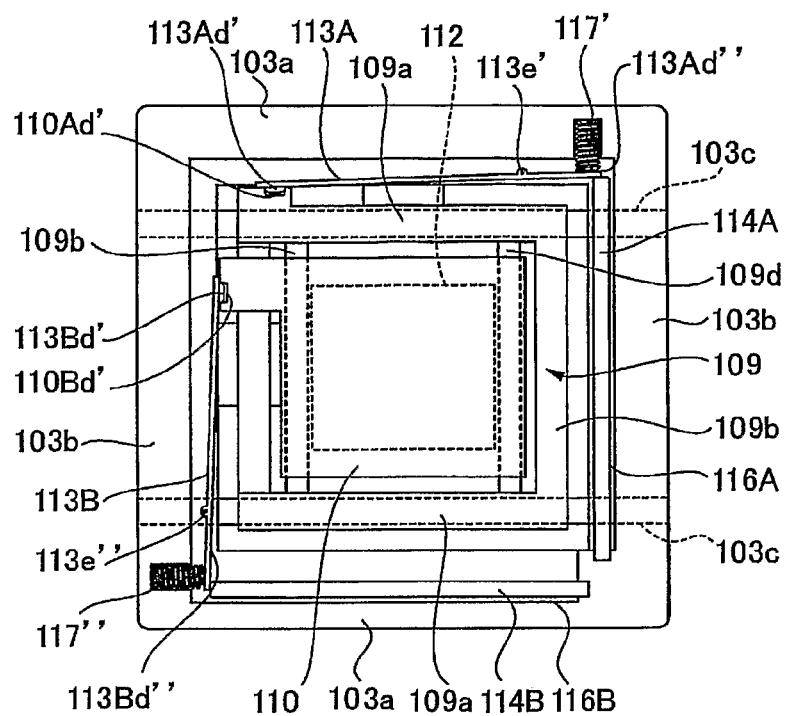
FIG. 33 is a plain view of the periphery of the image sensor retained by the retention lever according to the fifth embodiment of the present invention.
Figure 34:
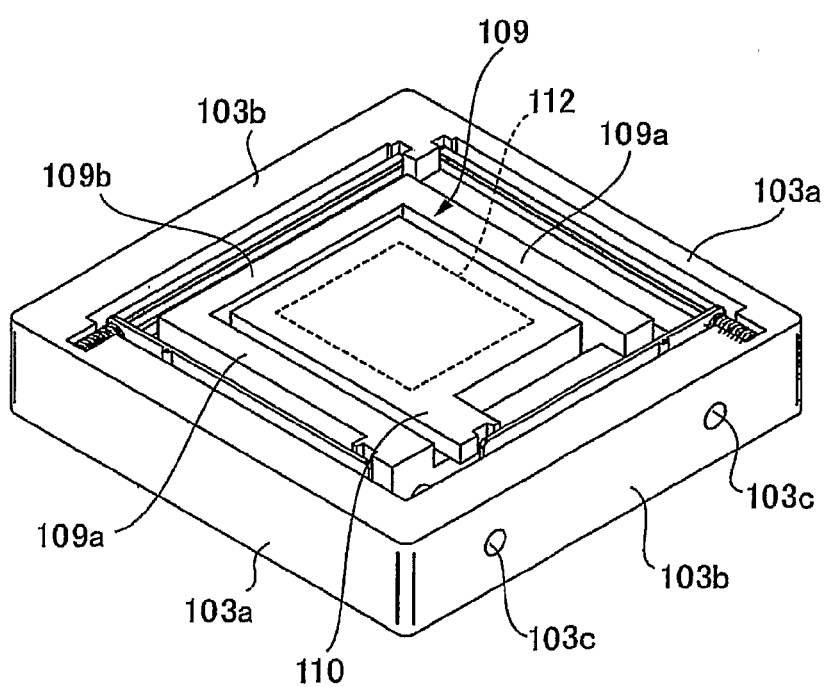
FIG. 34 is a perspective view of the periphery of the image sensor released from the retention of the retention lever according to the fifth embodiment of the present invention.

Meanwhile, upon turning-off of the blur correction switch, the shortened first actuator 114A extends to turn the first retention lever 113A at the support shaft 113e' as fulcrum in a direction to engage the first protrusion 113Ad' with the first recess 110Ad' (FIG. 33). At this point, the spring 117' accumulates a bias force to release the engagement of the first protrusion 113Ad' and the first recess 110Ad'. Likewise, upon turning-off of the blur correction switch, the shortened second actuator 114B extends to turn the second retention lever 113B around the support shaft 113e'' as fulcrum in a direction to engage the second protrusion 113Bd' with the second recess 110Bd' (FIG. 33). At this point, the spring 117'' accumulates a bias force to release the engagement of the second protrusion 113Bd' and the second recess 110Bd'. As a result, the image sensor 112 is retained in the base member 103 such that it is positioned at the original position at which the photographic optical axis O and the center of an image on the image sensor 112 coincide with each other, for example.

Figure 36:
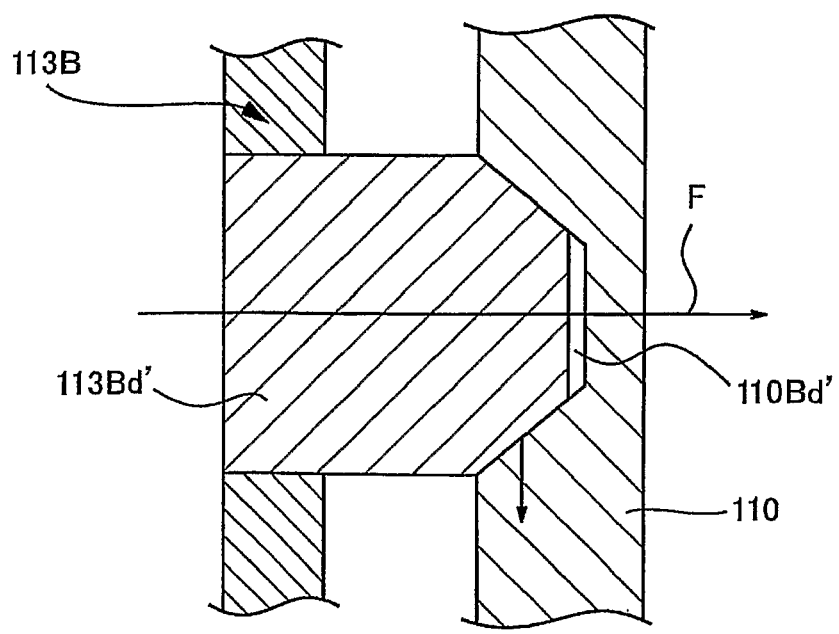
FIG. 36 is a cross sectional view of a partially enlarged protrusion and recess according to the fifth embodiment of the present invention.

According to the present embodiment, for retaining the image sensor support frame 110, the slide frame 109 is pushed in its moving direction. As shown in FIG. 36, setting contacting surfaces of the protrusion 113Bd' and recess 110Bd' in their cross sections to make an angle of 45 degrees or more makes it possible to reduce pushing force F to push the slide frame 109. This enables the retention of the image sensor support frame 110 to ease the force working for releasing the retention of the slide frame 109 even with the slide frame 109 and the image sensor support frame 110 separately retained in the direction orthogonal to the photographic optical axis O.

In the present embodiment, the slide frame 109 and the image sensor support frame 110 are separately retained in the direction orthogonal to the photographic optical axis O, which eliminates the necessity of the space SP between the lens barrel 104 and the base member 103 to move the first and second retention levers 113A, 113B and enables further reduction in the thickness of the blur correction unit in the photographic optical axis O.

Further, the retainer unit is configured that the slide frame 109 is fixed by the retention lever 113A in the direction orthogonal to the photographic optical axis O while the image sensor support frame 110 is fixed by the second retention lever 113B in the direction orthogonal to the photographic optical axis O. This can prevent displacement of the image sensor 112 in the photographic optical direction.

Further, the retainer unit according to the third to sixth embodiments can be configured to include a bias member to bias the retention lever vertically relative to its moving direction as well as the guide hole and the guide pin inserting into the guide hole provided on the retention lever and base member, respectively as shown in FIGS. 11, 12. This can prevent shakiness of the retention lever in the direction perpendicular to the moving direction thereof, even with over a predetermined length of gap between the guide hole and guide pin.

INDUSTRIAL AVAILABILITY

The above embodiments have described the imaging device such as digital still camera, digital video camera with the blur correction function to correct blurs in images at shooting. However, the present invention is not limited thereto. The present invention is applicable to mobile terminal devices such as a mobile phone with camera.

Although the present invention has been described in terms of exemplary embodiments, it is not limited thereto. It should be appreciated that variations may be made in the embodiments described by persons skilled in the art without departing from the scope of the present invention as defined by the following claims.

The invention claimed is:

1. An imaging apparatus comprising:
   an image sensor photoelectrically converting an image of a subject into an electric signal;
   an optical photographic system forming the image of the subject on an imaging plane of the image sensor;
   a lens barrel containing the optical photographic system and being extendable in a direction of an optical axis of the optical photographic system;
   a frame member movably supporting the image sensor in a plane perpendicular to the optical axis;
   a blur correction unit correcting a blur in the image due to hand shake by moving the frame member in the plane perpendicular to the optical axis;
   a retainer unit retaining the frame member in one of the optical axis direction and a direction perpendicular to the optical axis; and
   a base member disposed in a periphery of the frame member, wherein:
   the frame member has a recess; and
   the retainer unit comprises a retention lever mounted on the base member, extending to a periphery of the frame member and having, on one end thereof, a protrusion for engagement with the recess, and a driver unit moving the retention lever to engage the recess and protrusion and to release the engagement therebetween.

2. An imaging apparatus according to claim 1, wherein the recess is provided on the frame member in the optical axis direction of the optical photographic system.

3. An imaging apparatus according to claim 2, wherein: the recess is provided on a subject side of the frame member; and when the lens barrel is ejected to the subject side, forming a predetermined space between the lens barrel and the frame member, the driver unit drives the retention lever to move the one end in the predetermined space in a substantial optical axis direction to release the engagement of the recess and protrusion.

4. An imaging apparatus according to claim 3, wherein: the retainer unit further comprises a bias member biasing the retention lever; the retention lever has a support shaft in a middle portion in the direction perpendicular to the optical axis direction of the optical photographic system, and is movable around the support shaft and biased at the one end to the moving direction by the bias member; the driver unit comprises an operation shaft being movably retained in the optical axis direction and abutting with the other end of the retention lever, a cam member being provided around the operation shaft to convert a rotary movement thereof around the optical axis to a linear movement in the optical axis direction, and a rotary driver rotating the cam member; and the driver unit forwardly and reversely rotates the cam member by forward/reverse rotation of the rotary driver, thereby extending/shortening the operation shaft in the optical axis direction to move the other end of the retention lever to move the one end thereof.

5. An imaging apparatus according to claim 4, wherein the retention lever includes a guide hole in the moving direction and the base member includes a guide pin insertable into the guide hole.

6. An imaging apparatus according to claim 5, further comprising a bias member biasing the retention lever in the direction perpendicular to the moving direction.

7. An imaging apparatus according to claim 3, wherein: the retention lever is fixed at the other end in the base member; and the driver unit comprises an extendable actuator extending/shortening in the optical axis direction by electric power, and allows the actuator to extend to the other end of the retention lever in order to adjust pressure applied to the one end thereof to move the one end.

8. An imaging apparatus according to claim 3, wherein: the retention lever includes a support shaft at the other end in the direction perpendicular to the optical axis direction of the optical photographic system, and the one end thereof is movable around the support shaft and biased to the moving direction by the bias member; and the driver unit comprises an extendable actuator extending/shortening in the optical axis direction by electric power, and allows the actuator to extend to move the other end of the retention lever in order to move the one end thereof.

9. An imaging apparatus according to claim 3, wherein: the retention lever includes a support shaft in a middle portion in the direction perpendicular to the optical axis direction of the optical photographic system and two portions, one extending from the support shaft in the optical axis direction and the other extending from the support shaft in the direction perpendicular to the optical axis direction; the other portion of the retention lever is bent to the optical axis direction of the optical photographic system and movable around the support shaft, and the one portion thereof is biased to the moving direction by the bias member; and the driver unit comprises an extendable actuator extending/shortening in the direction perpendicular to the optical axis direction by electric power, and allows the actuator to extend to move the other portion of the retention lever in order to move the one portion thereof.

10. An imaging apparatus according to claim 2, wherein the recess is provided on the frame member on a side opposite to the subject side.

11. An imaging apparatus according to claim 1, wherein the recess is provided on the frame member in a direction perpendicular to the optical axis direction of the optical photographic system.

12. An imaging apparatus according to claim 11, wherein: the frame member comprises a first frame member moving in a first direction in the plane perpendicular to the optical axis direction of the optical photographic system and having the recess in the direction perpendicular to the optical axis direction thereof, and a second frame member moving in a second direction perpendicular to the first direction and having the recess in the direction perpendicular to the optical axis direction; and the retention lever comprises a first retention lever retaining the first frame member and a second retention lever retaining the second frame member.

13. An imaging apparatus according to claim 12, wherein: the retention lever includes a support shaft in a middle portion in the direction perpendicular to the optical axis direction of the optical photographic system, is movable around the support shaft and biased at the one end to the moving direction by the bias member; and the driver unit comprises an extendable actuator extending/shortening in the direction perpendicular to the optical axis direction by electric power, and allows the actuator to extend to move the other end of the retention lever in order to move the one end thereof.

14. An imaging apparatus according to claim 13, wherein a length from the support shaft to the one end of the retention lever is longer than a length from the support shaft to the other end thereof.

15. An imaging apparatus according to claim 1, wherein the recess is formed to have an inclined inner wall such that it widens from a bottom to an opening thereof.

* * * * *